United States Patent
Li et al.

(10) Patent No.: US 10,282,847 B2
(45) Date of Patent: May 7, 2019

(54) MONITORING SYSTEM OF A PASSENGER CONVEYOR AND MONITORING METHOD THEREOF

(71) Applicant: Otis Elevator Company, Farmington, CT (US)

(72) Inventors: JianGuo Li, Zhejiang (CN); ZhaoXia Hu, Zhejiang (CN); LongWen Wang, Shanghai (CN); Hui Fang, Shanghai (CN); Zhen Jia, Shanghai (CN); Jianwei Zhao, Shanghai (CN); Qiang Li, Shanghai (CN); Anna Su, Shanghai (CN); Alan Matthew Finn, Hebron, CT (US); Wei Ge, Haining (CN); Wilfrid Fuchs, Langenzersdorf (AT); Arthur Hsu, South Glastonbury, CT (US); Yanzhi Chen, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/663,448

(22) Filed: Jul. 28, 2017

(65) Prior Publication Data
US 2018/0029842 A1 Feb. 1, 2018

(30) Foreign Application Priority Data
Jul. 29, 2016 (CN) .......................... 2016 1 0610017

(51) Int. Cl.
*G06T 7/194* (2017.01)
*B66B 25/00* (2006.01)
(Continued)

(52) U.S. Cl.
CPC .............. *G06T 7/194* (2017.01); *B66B 21/02* (2013.01); *B66B 25/003* (2013.01);
(Continued)

(58) Field of Classification Search
CPC ........ B66B 29/06; B66B 25/006; G06T 7/194
See application file for complete search history.

(56) References Cited

U.S. PATENT DOCUMENTS 8,264,538 B2 * 9/2012 Horbruegger ........... B66B 29/06
348/143
9,123,133 B1 * 9/2015 Chen ....................... G06T 7/194
(Continued)

FOREIGN PATENT DOCUMENTS

| CN | 201321335 Y | 10/2009 |
| CN | 101665210 A | 3/2010 |

(Continued)

OTHER PUBLICATIONS

EP Communication; Extended European Search Report; Application No. 17184117.4-1731; dated Dec. 12, 2017, pp. 1-20.

*Primary Examiner* — Thomas Randazzo
(74) *Attorney, Agent, or Firm* — Cantor Colburn LLP

(57) ABSTRACT

The present invention relates to the field of passenger conveyor technologies, and provides a monitoring system of a passenger conveyor and a monitoring method thereof. In the monitoring system and detection method of the present invention, a monitored object of the passenger conveyor is sensed by using an imaging sensor and/or a depth sensing sensor to acquire a data frame, and the data frame is analyzed by a processing apparatus to monitor whether the monitored object is in a normal state. The monitored object may include a landing plate, a step, a barrier used in a maintenance and repair working condition and/or a step speed, and the like.

28 Claims, 9 Drawing Sheets

(51) Int. Cl.
  *B66B 29/00* (2006.01)
  *G06K 9/00* (2006.01)
  *G06T 7/174* (2017.01)
  *G06T 7/55* (2017.01)
  *G06T 7/246* (2017.01)
  *B66B 21/02* (2006.01)
  *B66B 29/06* (2006.01)
  *B66B 27/00* (2006.01)

(52) U.S. Cl.
  CPC ............ *B66B 25/006* (2013.01); *B66B 27/00* (2013.01); *B66B 29/005* (2013.01); *B66B 29/06* (2013.01); *G06K 9/00201* (2013.01); *G06T 7/174* (2017.01); *G06T 7/248* (2017.01); *G06T 7/55* (2017.01)

(56) References Cited

U.S. PATENT DOCUMENTS

| | | | | |
|---|---|---|---|---|
| 9,424,461 | B1* | 8/2016 | Yuan | G06K 9/00201 |
| 2002/0051491 | A1* | 5/2002 | Challapali | H04N 19/597 |
| | | | | 375/240.2 |
| 2003/0007665 | A1* | 1/2003 | Ponsot | B66B 25/00 |
| | | | | 382/103 |
| 2003/0053692 | A1* | 3/2003 | Hong | H04N 19/23 |
| | | | | 382/171 |
| 2005/0088520 | A1* | 4/2005 | Wiesinger | B66B 27/00 |
| | | | | 348/143 |
| 2007/0036432 | A1* | 2/2007 | Xu | G06K 9/344 |
| | | | | 382/173 |
| 2008/0252724 | A1* | 10/2008 | Horbruegger | B66B 29/06 |
| | | | | 348/143 |
| 2011/0031090 | A1* | 2/2011 | Nagao | B66B 29/005 |
| | | | | 198/323 |
| 2012/0103756 | A1* | 5/2012 | Braasch | B66B 25/003 |
| | | | | 198/323 |
| 2012/0283870 | A1* | 11/2012 | Senger | B66B 29/005 |
| | | | | 700/230 |
| 2013/0020174 | A1* | 1/2013 | Trojer | G01N 22/02 |
| | | | | 198/321 |
| 2014/0202827 | A1* | 7/2014 | Fan Jin Quan | B66B 29/06 |
| | | | | 198/322 |
| 2016/0368741 | A1* | 12/2016 | Blondiau | B66B 25/00 |
| 2017/0190548 | A1* | 7/2017 | Nelson | B66B 29/005 |
| 2018/0047173 | A1* | 2/2018 | Wang | G06T 7/136 |
| 2018/0082130 | A1* | 3/2018 | Saitwal | G06T 7/11 |
| 2018/0286075 | A1* | 10/2018 | Jones | G06F 15/18 |

FOREIGN PATENT DOCUMENTS

| | | | | |
|---|---|---|---|---|
| CN | 101676188 A | | 3/2010 | |
| CN | 101734545 A | | 6/2010 | |
| CN | 102001573 A | | 4/2011 | |
| CN | 203593510 U | | 5/2014 | |
| CN | 103863934 A | | 6/2014 | |
| CN | 104118792 A | | 10/2014 | |
| DE | 10219483 A1 | * | 11/2003 | ............ B66B 29/06 |
| EP | 2877420 A2 | | 6/2015 | |
| EP | 3279131 A1 | * | 2/2018 | ............ G06T 7/55 |
| FR | 2773791 A1 | | 7/1999 | |
| JP | 2006001737 A | | 1/2006 | |
| JP | 2010-269884 A | | 12/2010 | |
| JP | 2010269884 A | * | 12/2010 | ............ B66B 27/00 |
| JP | 2011236009 A | | 11/2011 | |
| KR | 100858783 B1 | | 9/2008 | |
| WO | 2015090764 A1 | | 6/2015 | |
| WO | 2015/171774 A1 | | 11/2015 | |

* cited by examiner

MONITORING SYSTEM OF A PASSENGER CONVEYOR AND MONITORING METHOD THEREOF

FOREIGN PRIORITY

This application claims priority to Chinese Patent Application No. 201610610017.8, filed Jul. 29, 2016, and all the benefits accruing therefrom under 35 U.S.C. § 119, the contents of which in its entirety are herein incorporated by reference.

TECHNICAL FIELD

The present invention belongs to the field of passenger conveyor technologies, and relates to automatic monitoring of a passenger conveyor.

BACKGROUND ART

A passenger conveyor (such as an escalators or a moving walkway) is increasingly widely applied in public places such as subways, shopping malls, airports, and the like, and the running safety thereof becomes increasingly important.

During running of a passenger conveyor, abnormalities such as reverse running, speed anomaly, Step missing, Landing Plate displacement or missing may occur, causing major safety accidents; or during a repair operation of the passenger conveyor, no Barrier is disposed due to a non-standard operation while the passenger conveyor is in a repair running state, and in this case, if a passenger enters the passenger conveyor, a major safety accident also occurs easily.

SUMMARY OF THE INVENTION

According to a first aspect of the present invention, a monitoring system of a passenger conveyor is provided, including: an imaging sensor and/or a depth sensing sensor configured to sense a monitored object of the passenger conveyor to acquire a data frame; and a processing apparatus configured to analyze the data frame to monitor whether the monitored object is in a normal state, the processing apparatus being configured to include: a background acquisition module configured to acquire a background model based on a data frame that is sensed when the monitored object is in a normal state or an abnormal state; a foreground detection module configured to compare a data frame sensed in real time with the background model to obtain a foreground object; and a working condition judgment module configured to perform data processing at least based on the foreground object to judge whether the monitored object is in a normal state.

According to another aspect of the present invention, a monitoring method of a passenger conveyor is provided, which includes steps of: sensing a monitored object of the passenger conveyor to obtain a data frame; acquiring a background model in advance based on a data frame that is sensed when the monitored object is in a normal state or an abnormal state; comparing a data frame sensed in real time with the background model to obtain a foreground object; and performing data processing at least based on the foreground object to judge whether the monitored object is in a normal state.

According to still another aspect of the present invention, a passenger conveying system is provided, including a passenger conveyor and the foregoing monitoring system.

The foregoing features and operations of the present invention will become more obvious according to the following description and the accompanying drawings.

BRIEF DESCRIPTION OF THE DRAWINGS

The following detailed description with reference to the accompanying drawings will make the foregoing and other objectives and advantages of the present invention more complete and clearer, wherein identical or similar elements are represented using identical reference signs.

DETAILED DESCRIPTION

The present invention is now described more completely with reference to the accompanying drawings. Exemplary embodiments of the present invention are illustrated in the accompanying drawings. However, the present invention may be implemented in lots of different forms, and should not be understood as being limited to the embodiments described herein. On the contrary, the embodiments are provided to make the disclosure thorough and complete, and fully convey the concept of the present invention to those skilled in the art. In the accompanying drawings, identical reference signs represent identical elements or parts, and therefore, descriptions thereof are omitted.

Some block diagrams in the accompanying drawings are functional entities, which do not necessarily correspond to physically or logically independent entities. These functional entities may be implemented in a software form, or implemented in one or more hardware modules or integrated circuits, or in different processing apparatuses and/or microcontroller apparatuses.

In the present invention, passenger conveyors include Escalators and Moving Walkways. In the embodiments illustrated below, an escalator is used as an example to describe the monitoring system and monitoring method of the embodiments of the present invention in detail. However, it should be understood that, the monitoring system and monitoring method for the escalator in the following embodiments may also be analogically applied to moving walkways. Adaptive improvements or the like that may need to be performed can be obtained by those skilled in the art with the teachings of the embodiments of the present invention.

It should be noted that, in the present invention, a "normal state" of a monitored object of the passenger conveyor refers to a working condition state in which the monitored object at least does not bring potential safety hazards to passengers; on the contrary, an "abnormal state" refers to a working condition state in which the monitored object at least may bring potential safety hazards to passengers, for example, a working condition state that does not conform to related standards or regulations. Those skilled in the art may define the "normal state" and "abnormal state" in advance according to a specific application environment and a specific monitored object.

Figure 1:
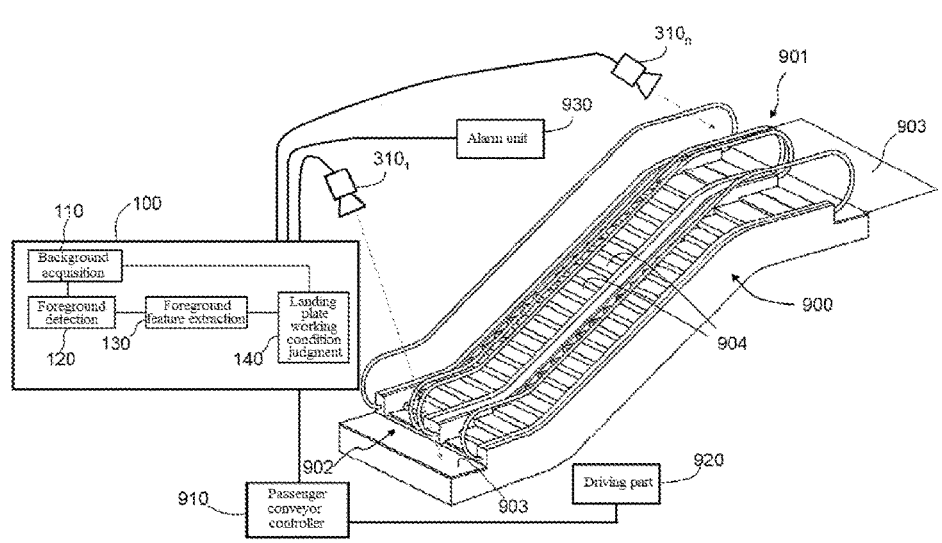
FIG. 1 is a schematic structural diagram of a monitoring system of a passenger conveyor according to a first embodiment of the present invention.

FIG. 1 is a schematic structural diagram of a monitoring system of a passenger conveyor according to a first embodiment of the present invention. The monitoring system according to the embodiment shown in FIG. 1 may be used to detect whether a state of a Landing Plate 903 of an escalator 900 is normal, for example, whether displacement or missing occurs, in a daily operation condition (including an operation condition with passengers and a no-load operation condition without passengers) of a passenger conveyor, wherein the landing plates 903 are usually fixed in an entry/exit region 901 at a first end of the escalator 900 and an entry/exit region 902 at a second end of the escalator 900. If the landing plate 903 is displaced or missing, a passenger is easily caught in the escalator 900, thus causing a major safety accident.

The monitoring system in the embodiment shown in FIG. 1 specifically includes a sensing apparatus 310 and a processing apparatus 100 coupled to the sensing apparatus 310, and the escalator 900 includes a passenger conveyor controller 910, a driving part 920 such as a motor, and an alarm unit 930.

The sensing apparatus 310 is specifically an imaging sensor or a depth sensing sensor, or a combination thereof. According to a specific requirement and a monitoring range of a sensor, the escalator 900 may be provided with one or more sensing apparatuses 310, for example, $310_1$ to $310_n$, N being an integer greater than or equal to 1. The sensing apparatus 310 is mounted in such a manner that it can clearly and accurately acquire a monitored object of the escalator 900, and the specific mounting manner and mounting position thereof are not limited. In this embodiment, there are two sensing apparatuses 310, which are disposed approximately above entry/exit regions (901 and 902) at two ends of the escalator 900 respectively, to sense landing plates 903 in the entry/exit regions (901 and 902). It should be understood that, to accurately sense the landing plate 903, an imaging sensor or a depth sensing sensor of a corresponding type may be selected according to a specific application environment, and even corresponding lighting lamps or the like may be configured above the entry/exit regions (901 and 902).

The sensing apparatus 310 may be an imaging sensor of a 2D image sensor of various types. It should be understood that, any image sensor capable of capturing an image frame including pixel brightness information can be applied herein. Certainly, an image sensor capable of capturing an image frame including pixel brightness information and color information (such as RGB information) may also be applied herein.

The sensing apparatus 310 may be any 1D, 2D, or 3D depth sensor or a combination thereof. Such a sensor is operable in an optical, electromagnetic, or acoustic spectrum that can generate a depth map (which is also known as a point cloud or an occupancy grid) of a corresponding dimension. Various depth sensing sensor technologies and devices include, but are not limited to: structured light measurement, phase shift measurement, time-of-flight measurement, a stereo triangulation device, an optical triangulation device plate, a light field camera, a coded aperture camera, a computational imaging technology, simultaneous localization and map-building (SLAM), an imaging radar, an imaging sonar, an echolocation device, a scanning LIDAR, a flashing LIDAR, a passive infrared (PIR) sensor, and a small focal plane array (FPA), or a combination including at least one of the foregoing. Different technologies may include active (transmitting and receiving signals) or passive (only receiving signals) technologies and are operable in a band of an electromagnetic or acoustic spectrum (such as visual and infrared). Depth sensing can achieve a particular advantage over conventional 2D imaging. The use of infrared sensing can achieve a particular benefit over visible spectrum imaging such that alternatively or additionally, the sensor can be an infrared sensor having one or more pixel spatial resolutions, for example, a passive infrared (PIR) sensor or a small IR focal plane array (FPA).

It should be noted that, there may be qualitative and quantitative differences between a 2D imaging sensor (such as a conventional monitoring camera) and the 1D, 2D or 3D depth sensing sensor to the extent that the depth sensing provides numerous advantages. In 2D imaging, reflected color (a mixture of wavelengths) from the first object in each radial direction of the imager is captured. A 2D image, then, may include a combined spectrum of source lighting and a spectral reflectivity of an object in a scene. The 2D image may be roughly interpreted as a picture by a person. In the 1D, 2D or 3D depth sensing sensor, there is no color (spectrum) information. More specifically, a distance (depth, range) to a first reflection object in a radial direction (1D) or directions (2D, 3D) from the sensor is captured. The 1D, 2D and 3D technologies may have inherent maximum detectable range limits and may have relatively lower spatial resolution than typical 2D imagers. In terms of relative immunity to ambient lighting problems, compared to conventional 2D imaging, the use of 1D, 2D, or 3D depth sensing may advantageously provide improved operations, and better separation and better privacy protection of shielded objects. The use of infrared sensing can achieve a particular benefit over visible spectrum imaging. For example, it is possible that a 2D image cannot be converted into a depth map, and a depth map does not have a capability of being converted into a 2D image (for example, artificial allocation of continuous colors or brightness to continuous depths may cause a person to roughly interpret a depth map in a manner somewhat akin to how a person sees a 2D image, while the depth map is not an image in a conventional sense).

When the sensing apparatus 310 is specifically a combination of an imaging sensor and a depth sensing sensor, the sensing apparatus 310 may be an RGB-D sensor, which may simultaneously acquire RGB information and depth (D) information.

The sensing apparatus 310 senses the landing plate 903 of the escalator 900 in real time and obtains multiple data frames, that is, sequence frames; if the sequence frames are acquired through sensing by the imaging sensor, the sequence frames are multiple image frames, and each pixel therein has, for example, corresponding brightness information and color information; if the sequence frames are acquired through sensing by the depth sensing sensor, the sequence frames are multiple depth maps, and each pixel or occupancy grid therein also has a corresponding depth dimension (reflecting depth information).

If it is necessary to monitor the landing plate 903 all the time, in both the operation condition with passengers and the no-load operation condition without passengers, multiple sensing apparatuses $310_1$ to $310_n$ all work simultaneously to acquire corresponding sequence frames, and each frame is transmitted to the processing apparatus 100. The processing apparatus 100 is responsible for analyzing each frame, and finally obtains information indicating whether the landing plate 903 of the escalator 900 is in a normal state, for example, determine whether displacement or missing occurs.

Specifically, the processing apparatus 100 is configured to include a background acquisition module 110 and a foreground detection module 120. The background acquisition module 110 obtains one or more 2D images or 3D depth maps in a no-load normal operation condition (that is, in the absence of passengers) of the escalator 900, and calculates a background based on the 2D images or 3D depth maps. Therefore, the background acquisition module 110 acquires a background model by learning sequence frames acquired when it is determined that the escalator 900 is in a no-load normal state. The background model may be established at an initialization stage of the monitoring system, that is, the system is initialized before the landing plate in the daily operation condition is monitored, to obtain a background model. The background model may be established through learning by using, but not limited to, a Gaussian Mixture Model, a Code Book Model, Robust Principle Components Analysis (RPCA), and the like. A background model obtained by learning image frames acquired by the imaging sensor is a typical brightness background model or chromaticity background model; a background model obtained by learning frames acquired by the depth sensing sensor is a typical depth background model.

It should be understood that, at the subsequent landing plate monitoring stage, the background model may be adaptively updated. When an application scenario, a sensor type, or a setting changes, a corresponding background model may be acquired again by means of learning at the initialization stage.

The foreground detection module 120 is configured to compare a data frame acquired in real time with the background model to obtain a foreground object; in most cases, the foreground object is correspondingly a passenger or an article carried by the passenger. Certainly, if the landing plate 903 is displaced or missing, a foreground obtained by comparing a portion of the data frame corresponding to the landing plate 903 with a corresponding portion of the background model also includes a feature reflecting that the landing plate 903 is displaced or missing. Specifically, in the comparison process, if an imaging sensor is used, the data frame is a 2D image, and the background model is also formed based on the 2D image; the comparison process specifically may be differential processing, for example, a pixel of the 2D image is compared with a corresponding pixel of the background model to calculate a difference (such as a brightness difference). When the difference is greater than a predetermined value, the pixel is retained. Therefore, a foreground object can be obtained. If a depth sensing sensor is used, the data frame is a depth map, and the background model is also formed based on the 3D depth map. For example, an occupancy grid in the depth map may be compared with a corresponding occupancy grid of the background model (for example, a depth difference is calculated), and when the difference is greater than a predetermined value, depth information of the occupancy grid is retained (indicating that the occupancy grid is). Therefore, a foreground object can be obtained.

In an embodiment, the foreground detection module 120 may eliminate noise of the foreground object by using some filtering technologies. For example, noise is eliminated by using erosion and dilation image processing technologies, so that the foreground object is obtained more accurately. It should be noted that, the filtering may include convolution about a spatial, temporal, or spatial-temporal kernel.

When the foregoing comparison is differential processing, it should be noted that, differential processing between a current depth map and the background model includes calculating a difference or distance between features (such as the centroid of cluster features or separate hyperplanes) of the current depth map and the background model, wherein the distance may be calculated by means of Minkowski-p distance measurement, Uncentered Pearson Correlation, or other methods.

In an embodiment, the processing apparatus 100 further includes a foreground feature extraction module 130. The foreground feature extraction module 130 extracts a corresponding foreground feature from the foreground object. In order to monitor the landing plate of the escalator 900, the extracted foreground feature includes features such as the shape and size of the foreground object, and may even include features such as the color and/or position. Taking the data frame acquired by the imaging sensor as an example, the color feature is embodied by the chromaticity of pixels of the foreground object, and the shape, size and position features are embodied by brightness value changes of the pixels in the foreground object. Taking the data frame acquired by the depth sensing sensor as an example, the shape, size and position features are embodied by depth value changes of occupancy grids in the foreground object.

It should be noted that, for the position feature, if the data frame is acquired by the depth sensing sensor, the position feature extracted by the foreground feature extraction module 130 is a 3D position feature.

It should be noted that, in this embodiment or the following embodiments, the extracted feature (descriptor) may be a shape feature or other features. The shape feature may be, for example, a histogram of oriented gradients (HoG), a Zernike moment, Centroid Invariance to boundary point distribution, Contour Curvature, or the like. The foreground feature extraction module may extract other features to provide additional information for shape (or morphological) matching or filtering. For example, other features may include, but are not limited to: features such as Scale Invariant Feature Transform (SIFT), a Speed-Up Robust Feature (SURF) algorithm, Affine Scale Invariant Feature Transform (ASIFT), other SIFT variables, Harris Corner Detector, a Smallest Univalue Segment Assimilating Nucleus (SUSAN) algorithm, Features from Accelerated Segment Test (FAST) corner detection, Phase Correlation, a Normalized Cross-Correlation, Gradient Location Orientation Histogram (GLOH) algorithm, a Binary Robust Independent Elementary Features (BRIEF) algorithm, a Center Surround Extremas (CenSure/STAR) algorithm, and Oriented and Rotated BRIEF (ORB) algorithm. The foreground feature extraction module may further extract a color, a color histogram, an edge histogram, and so on.

Further, the processing apparatus 100 further includes a landing plate working condition judgment module 140. The working condition judgment module 140 judges whether the landing plate 903 is in a normal state based on the foreground feature. Specifically, comparison judgment may be performed on the foreground feature by using the background model. For example, by comparing the shape, size and position features of the foreground object with shape, size and position features about the landing plate in the background model, it is judged whether the landing plate is displaced or missing; or by comparing the shape, size, position and color features of the foreground object with shape, size, position and color features about the landing plate in the background model, it is judged whether the landing plate is missing or displaced. It should be noted that, the shape, size and color feature information about the landing plate in the background model may be implemented in the background acquisition module 110. If the foreground feature is a foreground feature of a foreground object of a passenger, when the foreground feature is compared with the feature information about the landing plate 903 in the background model, it can be judged that the foreground feature is unrelated to the landing plate 903, and the landing plate working condition judgment module 140 can easily judge that the landing plate 903 is in a normal state.

In this embodiment or other embodiments, the features used by the landing plate working condition judgment module may be compared or classified as a particular shape, wherein one or more of the following technologies are used: clustering, Deep Learning, Convolutional Neural Networks, Recursive Neural Networks), Dictionary Learning, Bag of visual words, Support Vector Machine (SVM), Decision Trees, Fuzzy Logic, and the like.

It should be noted that, in this embodiment or other embodiments, during comparison, a difference between features may be determined by using one or more of the following methods: Bayesian inference, Markov Model techniques, Hidden Markov Models (HMM), Markov Decision Processes (MDP), Partially Observable MDPs (MPD), Markov Decision Logic, Probabilistic Programming, Deep Learning, Neural Networks, Convolutional Neural Networks, Recursive Neural Networks, Dictionary Learning, Bag of visual words, Support Vector Machine (SVM), Decision Trees, Fuzzy Logic, and the like.

Taking landing plate missing in 2D image processing as an example, the acquired foreground object may include a 2D image of an object after the landing plate 903 is open, and based on the 2D image of the object, features such as the position, size and shape of the object are also extracted, which are further compared with the background model, for example, features such as shapes and sizes corresponding to the same position are compared. Therefore, it can be judged that a particular position lacks a landing plate, thus directly judging that the landing plate is missing.

Taking landing plate missing in depth map processing as an example, the acquired foreground object may include a depth map of an object after the position of the landing plate is open, and based on the depth map of the object, features such as the position, size and 3D shape of the object are also extracted, which are further compared with the background model, for example, features such as sizes and 3D shapes corresponding to the same position are compared. Therefore, it can be judged that a particular position lacks a landing plate, thus directly judging that the landing plate is missing.

It should be noted that, in the landing plate working condition judgment module 140 of the processing apparatus 100, if it is judged, according to the features such as the shape and size of the acquired foreground object, that the foreground object is a passenger or an article carried by the passenger, and it is judged, according to the position feature of the acquired foreground object, that the passenger or the article carried by the passenger is on the landing plate 903, considering that an image or a depth map of the landing plate 903 (a portion not shielded by the passenger or the article carried by the passenger) may be relatively obscure and it is relatively difficult to extract features of the corresponding foreground object (if displacement or missing occurs) based on the landing plate 903 in the unshielded portion, the landing plate working condition judgment module 140 may give up judgment on the current data frame or give up the judgment result and proceed to data processing on the next data frame, till it is judged, according to the position feature of the acquired foreground object, that the passenger or the article carried by the passenger is not on the landing plate 903, and a judgment result based on this data frame is used as a monitoring result of the landing plate 903. Taking a passenger being sensed as an example, the passenger may be acquired as a foreground object, and at the same time, the corresponding features are also extracted; the landing plate working condition judgment module 140 may judge that the foreground object is a passenger based on the DPM technology and the extracted features.

It should be understood that, in another embodiment, if the monitored escalator is in a no-load normal state, in this case, the data frame acquired by the sensing apparatus 310 is, in fact, basically the same as the data frame for calculating the background model (if the landing plate 903 is not displaced or missing). In this case, there is basically no foreground object in the foreground detection module 120 (for example, there is only noise information). At this point, the landing plate working condition judgment module 140 may directly determine that the monitored object is in a normal state, and does not need to make judgment based on the foreground feature extracted by the foreground feature extraction module 130.

Further, the landing plate working condition judgment module 140 may be configured as follows: only when the judgment result based on multiple continuous adjacent data frames is that the landing plate 903 is in a same abnormal state (such as missing), does the landing plate working condition judgment module 140 determine that the current landing plate 903 is in the abnormal state, which helps improve the judgment accuracy.

It should be noted that, adjacent frames are defined as any two frames in a temporary sequence, but are not limited to immediately successive frames. A speed of an object in the adjacent frames may be determined based on timestamps of the frames or based on an average frame time and the count of successive frames between adjacent frames.

When the landing plate working condition judgment module 140 in the processing apparatus 100 in the foregoing embodiment determines that the monitored landing plate 903 is in an abnormal state (for example, the landing plate is missing or displaced), a corresponding signal may be sent to the passenger conveyor controller 910 of the escalator 900, so that corresponding measures are taken. For example, the controller 910 further sends a signal to the driving part 920 to reduce a step running speed, or sends a signal to a braking part (not shown in the figure) to perform braking. The processing apparatus 100 may further send a signal to an alarm unit 930 mounted above the escalator 900, to remind the passenger to watch out, for example, a message such as "the landing plate is moving; please do not step on the landing plate" is broadcast. Certainly, the processing apparatus 100 may further send a signal to an elevator maintenance center of a building, to prompt that on-site processing needs to be performed in time. Measures taken when it is found that the landing plate 903 of the escalator 900 is in an abnormal state are not limited.

The monitoring system in the embodiment shown in FIG. 1 may automatically monitor the state of the landing plate 903 of the escalator 900 in real time, the monitoring is accurate and abnormal conditions of the landing plate can be found in time, helping prevent safety accidents.

Figure 2:
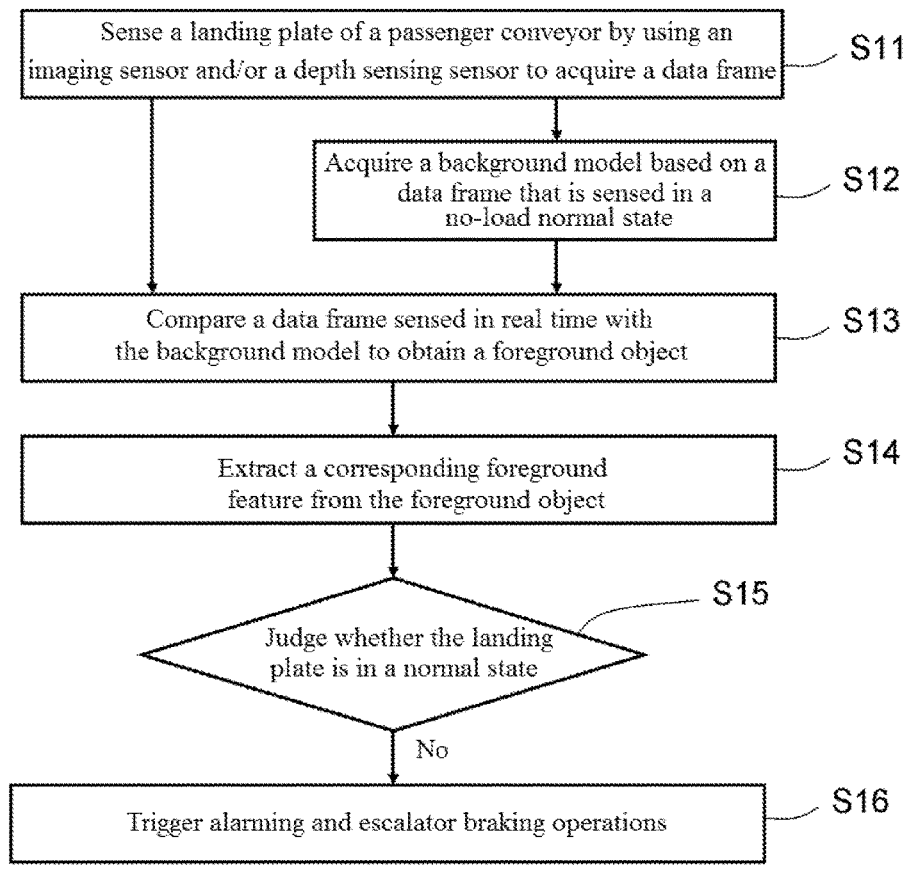
FIG. 2 is a schematic flowchart of a monitoring method of a passenger conveyor according to a first embodiment of the present invention.

A method procedure of landing plate monitoring based on the monitoring system in the embodiment shown in FIG. 1 is illustrated according to FIG. 2. A working principle of the monitoring system according to the embodiment of the present invention is further described with reference to FIG. 1 and FIG. 2.

First, in step S11, a landing plate of a passenger conveyor is sensed by using an imaging sensor and/or a depth sensing sensor to acquire a data frame. During acquisition of a background model through learning, the data frame may be acquired through sensing in a no-load normal state (the escalator 900 has no passenger thereon and the landing plate 903 is completely normal); in other cases, the data frame is acquired at any time in a daily operation condition, for example, 30 data frames are acquired per second, and sequence frames in a time period of 5 seconds are acquired at predetermined intervals or acquired continuously, for use in subsequent analysis.

Further, in step S12, a background model is acquired based on the data frame sensed in the no-load normal state. This step is accomplished in the background acquisition module 110, and may be implemented at the initialization stage of the system. If both the imaging sensor and the depth sensing sensor are used, background models are acquired by learning separately based on data frames acquired by the imaging sensor and the depth sensing sensor respectively.

Further, in step S13, a data frame sensed in real time is compared with the background model to obtain a foreground object. This step is accomplished in the foreground detection module 120, and the foreground object may be sent to the landing plate working condition judgment module 140 for analysis.

Further, in step S14, a corresponding foreground feature is extracted from the foreground object. This step is accomplished in the foreground feature extraction module 130, and the extracted foreground feature includes the shape and size of the foreground object, and even further includes information such as color and/or position. Taking the data frame acquired by the imaging sensor as an example, the color information is embodied through chromaticity of each pixel of the foreground object; the shape, size and position information is embodied through changes in brightness values of pixels in the foreground object. Taking the data frame acquired by the depth sensing sensor as an example, the shape, size and position is embodied by changes in depth values of occupancy grids in the foreground object.

Further, in step S15, it is judged whether the landing plate is in a normal state, and if the judgment result is "no", it indicates that the landing plate 903 is in an abnormal state currently, and step S16 is performed, to trigger alarming and escalator braking operations. Step S15 and step S16 are accomplished in the landing plate working condition judgment module. Specifically, comparison judgment may be performed on the foreground feature by using the background model. For example, by comparing the shape, size and position features of the foreground object with shape, size and position features about the landing plate in the background model, it is judged whether the landing plate is displaced or missing; or by comparing the shape, size, position and color features of the foreground object with shape, size, position and color features about the landing plate in the background model, it is judged whether the landing plate is missing or displaced. It should be noted that, the shape, size and color feature information about the landing plate in the background model may be implemented in the background acquisition module 110. If the foreground feature is a foreground feature of a foreground object of a passenger, when the foreground feature is compared with the feature information about the landing plate 903 in the background model, it can be judged that the foreground feature is unrelated to the landing plate 903, and the landing plate working condition judgment module 140 can easily judge that the landing plate 903 is in a normal state.

During judgment, if it is judged, according to the features such as the shape and size of the acquired foreground object, that the foreground object is a passenger or an article carried by the passenger, and it is judged, according to the position feature of the acquired foreground object, that the passenger or the article carried by the passenger is on the landing plate 903, in an embodiment, in step S15, considering that an image or a depth map of the landing plate 903 (a portion not shielded by the passenger or the article carried by the passenger) may be relatively obscure and it is relatively difficult to extract features of the corresponding foreground object (if displacement or missing occurs) based on the landing plate 903 in the unshielded portion, the landing plate working condition judgment module 140 may give up judgment on the current data frame or give up the judgment result and proceed to data processing on the next data frame, till it is judged, according to the position feature of the acquired foreground object, that the passenger or the article carried by the passenger is not on the landing plate 903, and a judgment result based on this data frame is used as a monitoring result of the landing plate 903.

In another embodiment, if the monitored escalator is in a no-load normal state, in this case, the data frame acquired by the sensing apparatus 310 is, in fact, basically the same as the data frame for calculating the background model (if the landing plate 903 is not displaced or missing). In this case, there is basically no foreground object in the foreground detection module 120 (for example, there is only noise information). At this point, in step S15, the landing plate working condition judgment module 140 may directly determine that the monitored object is in a normal state, and does not need to make judgment based on the foreground feature extracted by the foreground feature extraction module 130.

In step S15, the process proceeds to step S16 only when judgment results of multiple continuous data frames are "no". In this way, the accuracy of judgment is improved, to prevent misoperation.

So far, the landing plate monitoring process in the daily operation condition in the foregoing embodiment has basically ended, and this process may be repeated and continuously performed, to continuously monitor the landing plate of the escalator 900. It should be noted that, if both the imaging sensor and the depth sensing sensor are used, the imaging sensor and the depth sensing sensor may separately acquire respective data frames, and in steps S12 to S15, processing is separately performed on the respective data frames; and when the judgment result of the data frame corresponding to either of the imaging sensor and the depth sensing sensor is "no" in step S15, step S16 is performed. In this way, defects of monitoring by either of the imaging sensor and the depth sensing sensor can be avoided, ensuring that the abnormal state of the landing plate is detected timely and reliably.

Figure 3:
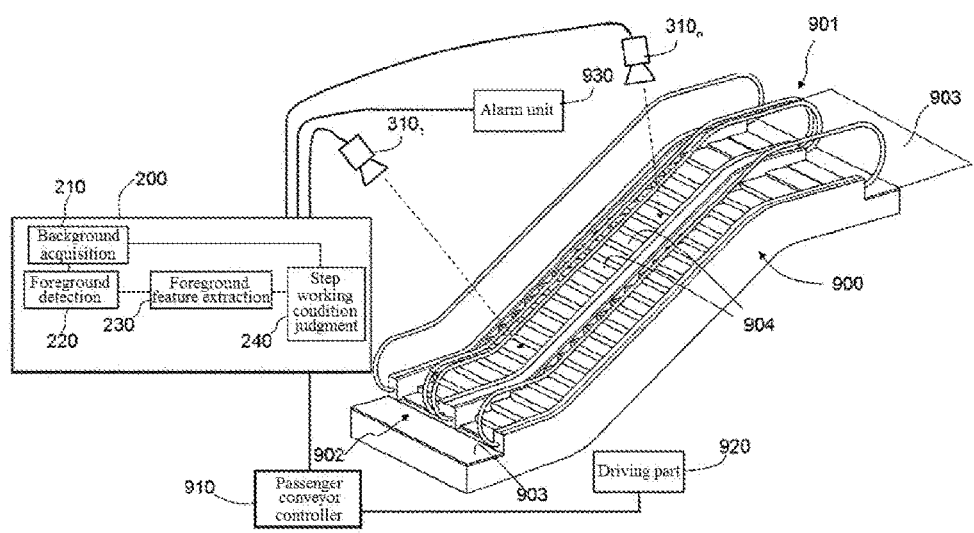
FIG. 3 is a schematic structural diagram of a monitoring system of a passenger conveyor according to a second embodiment of the present invention.

FIG. 3 is a schematic structural diagram of a monitoring system of a passenger conveyor according to a second embodiment of the present invention. The monitoring system of the embodiment shown in FIG. 3 may be used for monitoring whether a state of a Step 904 of an escalator 900 in a daily operation condition (including an operation condition with passengers and a no-load operation condition without passengers) is normal, for example, whether step missing occurs. If the step 904 is missing and a passenger still takes the escalator 900, a major safety accident occurs easily, and this needs to be completely avoided.

The monitoring system of the embodiment shown in FIG. 3 specifically includes a sensing apparatus 310 and a processing apparatus 200 coupled to the sensing apparatus 310. The escalator 900 includes a passenger conveyor controller 910, a driving part 920 such as a motor, and an alarm unit 930.

The sensing apparatus 310 is specifically an imaging sensor or a depth sensing sensor, or a combination thereof. According to a specific requirement and a monitoring range of a sensor, the escalator 900 may be provided with one or more sensing apparatuses 310, for example, $310_1$ to $310_n$, N being an integer greater than or equal to 1. The sensing apparatus 310 is mounted in such a manner that it can clearly and accurately acquire a monitored object of the escalator 900, and the specific mounting manner and mounting position thereof are not limited. In this embodiment, there may be one or two sensing apparatuses 310, which are mounted approximately right above a section of steps 904 of the escalator 900. It should be understood that, to accurately sense the steps 904, an imaging sensor or a depth sensing sensor of a corresponding type may be selected according to a specific application environment, and even corresponding lighting lamps or the like may be configured above a section of the steps 904.

Specific arrangement of the sensing apparatus 310 is completely the same as that in the embodiment shown in FIG. 1, and descriptions thereof are omitted here.

The sensing apparatus 310 senses the step 904 of the escalator 900 in real time and obtains multiple data frames, that is, sequence frames; if the sequence frames are acquired through sensing by the imaging sensor, the sequence frames are multiple image frames, and each pixel therein has, for example, corresponding brightness information and color information; if the sequence frames are acquired through sensing by the depth sensing sensor, the sequence frames are multiple depth maps, and each pixel or occupancy grid therein also has a corresponding depth dimension (reflecting depth information).

If it is necessary to monitor the step 904 all the time, in both the operation condition with passengers and the no-load operation condition without passengers, multiple sensing apparatuses $310_1$ to $310_n$ all work simultaneously to acquire corresponding sequence frames, and each frame is transmitted to the processing apparatus 200. The processing apparatus 200 is responsible for analyzing each frame, and finally obtains information indicating whether the step 904 of the escalator 900 is in a normal state, for example, determine whether step missing occurs.

Specifically, the processing apparatus 200 is configured to include a background acquisition module 210 and a foreground detection module 220. The background acquisition module 210 obtains one or more 2D images or 3D depth maps in a no-load normal operation condition (that is, in the absence of passengers) of the escalator 900, and calculates a background based on the 2D images or 3D depth maps. Therefore, the background acquisition module 210 acquires a background model by learning sequence frames acquired when it is determined that the escalator 900 is in a no-load normal state. The background model may be established at an initialization stage of the monitoring system, that is, the system is initialized before the step in the daily operation condition is monitored, to obtain a background model. The background model may be established through learning by using, but not limited to, a Gaussian Mixture Model, a Code Book Model, Robust Principle Components Analysis (RPCA), and the like. A background model obtained by learning image frames acquired by the imaging sensor is a typical brightness background model or chromaticity background model; a background model obtained by learning frames acquired by the depth sensing sensor is a typical depth background model.

It should be understood that, at the subsequent step monitoring stage, the background model may be adaptively updated. When an application scenario, a sensor type, or a setting changes, a corresponding background model may be acquired again by means of learning at the initialization stage.

The foreground detection module 220 is configured to compare a data frame acquired in real time with the background model to obtain a foreground object; for example, a differential method is used to obtain the foreground object. In most cases, the foreground object is correspondingly a passenger or an article carried by the passenger. Certainly, if the step 904 is missing, a foreground obtained by comparing a portion of the data frame corresponding to the step 904 with a corresponding portion of the background model also includes a feature reflecting that the step 904 is missing. Specifically, in the comparison process, if an imaging sensor is used, the data frame is a 2D image, and the background model is also formed based on the 2D image; the comparison process specifically may be differential processing, for example, a pixel of the 2D image is compared with a corresponding pixel of the background model to calculate a difference (such as a brightness difference). When the difference is greater than a predetermined value, the pixel is retained. Therefore, a foreground object can be obtained. If a depth sensing sensor is used, the data frame is a depth map, and the background model is also formed based on the 3D depth map. For example, an occupancy grid in the depth map may be compared with a corresponding occupancy grid of the background model (for example, a depth difference is calculated), and when the difference is greater than a predetermined value, depth information of the occupancy grid is retained (indicating that the occupancy grid is). Therefore, a foreground object can be obtained.

In an embodiment, the foreground detection module 220 may eliminate noise of the foreground object by using some filtering technologies. For example, noise is eliminated by using erosion and dilation image processing technologies, so that the foreground object is obtained more accurately.

In an embodiment, the processing apparatus 200 further includes a foreground feature extraction module 230. The foreground feature extraction module 230 extracts a corresponding foreground feature from the foreground object. In order to monitor the step of the escalator 900, the extracted foreground feature includes the shape and size of the foreground object, and may even include information such as the color and/or position. Taking the data frame acquired by the imaging sensor as an example, the color information is embodied by the chromaticity of pixels of the foreground object, and the shape, size and position information is embodied by brightness value changes of the pixels in the foreground object. Taking the data frame acquired by the depth sensing sensor as an example, the shape, size and position features are embodied by depth value changes of occupancy grids in the foreground object.

It should be noted that, for the position feature, if the data frame is acquired by the depth sensing sensor, the position feature extracted by the foreground feature extraction module 130 is a 3D position feature.

Further, the processing apparatus 200 further includes a step working condition judgment module 240. The working condition judgment module 240 judges whether the step 904 is in a normal state based on the foreground feature. Specifically, comparison judgment may be performed on the foreground feature by using the background model. For example, by comparing the shape, size and position features of the foreground object with shape, size and position features about the step in the background model, it is judged whether the step is missing; or by comparing the shape, size, position and color features of the foreground object with shape, size, position and color features about the step in the background model, it is judged whether the step is missing. It should be noted that, the shape, size and color feature information about the step in the background model may be implemented in the background acquisition module 210. If the foreground feature is a foreground feature of a foreground object of a passenger, when the foreground feature is compared with the feature information about the step 904 in the background model, it can be judged that the foreground feature is unrelated to the step 904, and the step working condition judgment module 240 can easily judge that the step 904 is in a normal state.

Taking step missing in 2D image processing as an example, the acquired foreground object may include a 2D image of an object after the step 904 is missing and the position of the step 904 is open, and based on the 2D image of the object, features such as the position, size and shape of the object are also extracted, which are further compared with the background model, for example, features such as shapes and sizes corresponding to the same position are compared. Therefore, it can be judged that a particular position lacks a step, thus directly judging that the step is missing.

Taking step missing in depth map processing as an example, the acquired foreground object may include a depth map of an object after the position of the step is open, and based on the depth map of the object, features such as the position, size and 3D shape of the object are also extracted, which are further compared with the background model, for example, features such as 3D shapes corresponding to the same position are compared. Therefore, it can be judged that a particular position lacks a step, thus directly judging that the step is missing.

It should be noted that, in the step working condition judgment module 240 of the processing apparatus 200, if it is judged, according to the features such as the shape and size of the acquired foreground object, that the foreground object is a passenger or an article carried by the passenger, and it is judged, according to the position feature of the acquired foreground object, that the passenger or the article carried by the passenger is on a step 904 of a corresponding region, considering that an image or a depth map of the step 904 in this region (a portion not shielded by the passenger or the article carried by the passenger) may be relatively obscure at present and it is relatively difficult to extract features of the corresponding foreground object (if step missing occurs) based on the step 904 in the unshielded portion, the step working condition judgment module 240 may give up judgment on the current data frame or give up the judgment result and proceed to data processing on the next data frame, the foreground object corresponding to the passenger or the article carried by the passenger does not exist on the step 904 in a corresponding region of the acquired data frame, and a judgment result based on this data frame is used as a monitoring result of the step 904.

It should be understood that, in another embodiment, assuming that the monitored escalator is in a no-load normal state, in this case, the data frame acquired by the sensing apparatus 310 is, in fact, basically the same as the data frame for calculating the background model (if the step 904 is not missing). In this case, there is basically no foreground object in the foreground detection module 220 (for example, there is only noise information). At this point, the step working condition judgment module 240 may directly determine that the monitored object is in a normal state, and does not need to make judgment based on the foreground feature extracted by the foreground feature extraction module 230. Certainly, if there is a foreground object (which is probably caused by step missing), judgment is still made based on the foreground feature extracted by the foreground feature extraction module 230.

Further, the step working condition judgment module 240 may be configured to determine, only when judgment results based on multiple (such as two) continuous data frames are that a same step 904 is missing, that the current step 904 is in the abnormal state, which helps improve the judgment accuracy.

When the step working condition judgment module 240 in the processing apparatus 200 in the foregoing embodiment determines that the monitored step 904 is in an abnormal state (for example, the step is missing), a corresponding signal may be sent to the passenger conveyor controller 910 of the escalator 900, so that corresponding measures are taken. For example, the controller 910 further sends a signal to the driving part 920 to reduce running speeds of the escalator and the handrail, or sends a signal to a braking part (not shown in the figure) to perform braking. The processing apparatus 200 may further send a signal to an alarm unit 930 mounted above the escalator 900, to remind the passenger to watch out, for example, a message such as "a step is missing; please watch out" is broadcast. Certainly, the processing apparatus 200 may further send a signal to an elevator maintenance center of a building, to prompt that on-site processing needs to be performed in time. Measures taken when it is found that the step 904 of the escalator 900 is in an abnormal state are not limited.

The monitoring system in the embodiment shown in FIG. 3 may automatically monitor the state of the step 904 of the escalator 900 in real time, the monitoring is accurate and abnormal conditions of the step can be found in time, helping prevent safety accidents.

Figure 4:
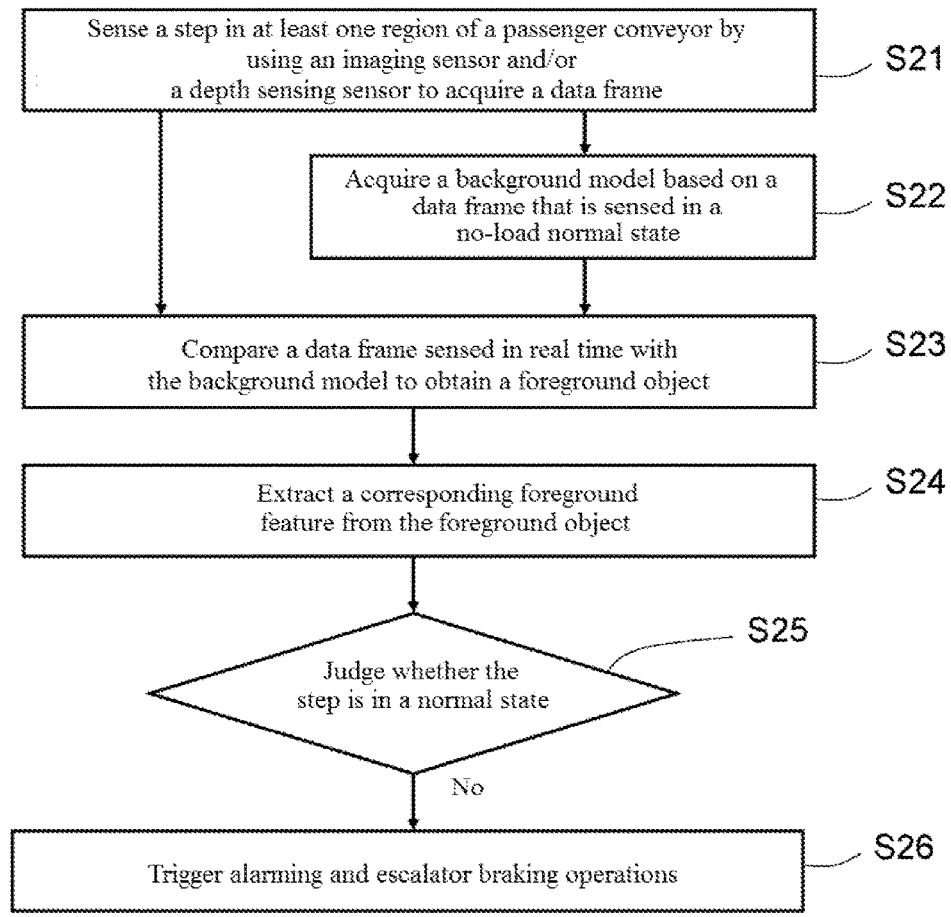
FIG. 4 is a schematic flowchart of a monitoring method of a passenger conveyor according to a second embodiment of the present invention.

A method procedure of step monitoring based on the monitoring system in the embodiment shown in FIG. 3 is illustrated according to FIG. 4. A working principle of the monitoring system according to the embodiment of the present invention is further described with reference to FIG. 3 and FIG. 4.

First, in step S21, a step of a passenger conveyor is sensed by using an imaging sensor and/or a depth sensing sensor to acquire a data frame. During acquisition of a background model through learning, the data frame may be acquired through sensing in a no-load normal state (the escalator 900 has no passenger thereon and the step 904 is completely normal); in other cases, the data frame is acquired at any time in a daily operation condition, for example, 30 data frames are acquired per second, and sequence frames in a predetermined time period (for example, a period in which the step turns for a cycle) are acquired at predetermined intervals or acquired continuously, for use in subsequent analysis.

Further, in step S22, a background model is acquired based on the data frame sensed in the no-load normal state. This step is accomplished in the background acquisition module 210, and may be implemented at the initialization stage of the system. If both the imaging sensor and the depth sensing sensor are used, background models are acquired by learning separately based on data frames acquired by the imaging sensor and the depth sensing sensor respectively.

Further, in step S23, a data frame sensed in real time is compared with the background model to obtain a foreground object. This step is accomplished in the foreground detection module 220, and the foreground object may be sent to the step working condition judgment module 240 for analysis.

Further, in step S24, a corresponding foreground feature is extracted from the foreground object. This step is accomplished in the foreground feature extraction module 230, and the extracted foreground feature includes the shape and size of the foreground object, and even further includes information such as color and/or position.

Further, in step S25, it is judged whether the step is in a normal state, and if the judgment result is "no", it indicates that the step 904 is in an abnormal state currently, and step S26 is performed, to trigger alarming and escalator braking operations. Step S25 and step S26 are accomplished in the step working condition judgment module. Specifically, comparison judgment may be performed on the foreground feature by using the background model. For example, by comparing the shape, size and position features of the foreground object with shape, size and position features about the step in the background model, it is judged whether the step is missing; or by comparing the shape, size, position and color features of the foreground object with shape, size, position and color features about the step in the background model, it is judged whether the step is missing or displaced. It should be noted that, the shape, size and color feature information about the step in the background model may be implemented in the background acquisition module 210. If the foreground feature is a foreground feature of a foreground object of a passenger, when the foreground feature is compared with the feature information about the step 904 in the background model, it can be judged that the foreground feature is unrelated to the step 904, and the step working condition judgment module 240 can easily judge that the step 904 is in a normal state.

In step S25, the process proceeds to step S26 only when judgment results of multiple continuous data frames are "no". In this way, the accuracy of judgment is improved, to prevent misoperation.

So far, the step monitoring process in the daily operation condition in the foregoing embodiment has basically ended, and this process may be repeated and continuously performed, to continuously monitor the step of the escalator 900. It should be noted that, if both the imaging sensor and the depth sensing sensor are used, the imaging sensor and the depth sensing sensor may separately acquire respective data frames, and in steps S22 to S25, processing is separately performed on the respective data frames; and when the judgment result of the data frame corresponding to either of the imaging sensor and the depth sensing sensor is "no" in step S25, step S26 is performed. In another alternative embodiment, the process of steps S22 to S25 may be performed on data from the imaging sensor and the depth sensing sensor respectively by using one or more of the following technologies: Bayesian estimation, Maximum likelihood (ML), Maximum a priori (MAP), Non-linear least squares, and the like. In this way, defects of monitoring by either of the imaging sensor and the depth sensing sensor can be avoided, ensuring that the abnormal state of the step is detected timely and reliably.

Figure 5:
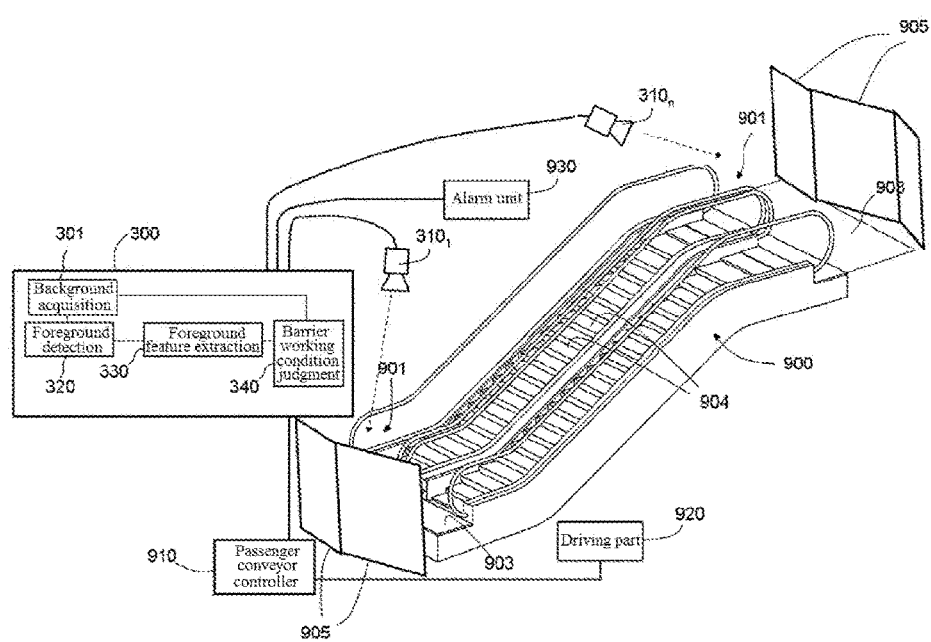
FIG. 5 is a schematic structural diagram of a monitoring system of a passenger conveyor according to a third embodiment of the present invention.

FIG. 5 is a schematic structural diagram of a monitoring system of a passenger conveyor according to a third embodiment of the present invention. The monitoring system according to the embodiment shown in FIG. 5 may be used to detect whether a state of a Barrier 905 of an escalator 900 is normal, for example, whether the barrier is missing, in a maintenance and repair working condition. If the barrier 905 is missing or displaced at an improper position, a passenger may enter the escalator 900 in the maintenance and repair working condition, which easily causes a major safety accident, and this needs to be completely avoided.

The monitoring system in the embodiment shown in FIG. 5 specifically includes a sensing apparatus 310 and a processing apparatus 300 coupled to the sensing apparatus 310, and the escalator 900 includes a passenger conveyor controller 910, a driving part 920 such as a motor, and an alarm unit 930.

The sensing apparatus 310 is specifically an Imaging sensor or a Depth sensing sensor, or a combination thereof. According to a specific requirement and a monitoring range of a sensor, the escalator 900 may be provided with one or more sensing apparatuses 310, for example, $310_1$ to $310_n$, N being an integer greater than or equal to 1. The sensing apparatus 310 is mounted in such a manner that it can clearly and accurately acquire a monitored object of the escalator 900, and the specific mounting manner and mounting position thereof are not limited. In this embodiment, there are two sensing apparatuses 310, which are disposed approximately above entry/exit regions (901 and 902) at two ends of the escalator 900 respectively, to sense barriers 905 in the entry/exit regions (901 and 902). It should be understood that, to accurately sense the barrier 905, an imaging sensor or a depth sensing sensor of a corresponding type may be selected according to a specific application environment, and even a corresponding lighting lamp or the like may be configured above the position where the barrier 905 should be disposed.

Specific arrangement of the sensing apparatus 310 is completely the same as that in the embodiment shown in FIG. 1, and descriptions thereof are omitted here.

During inspection and repair, the sensing apparatus 310 is triggered to sense a region where the barrier 905 of the escalator 900 should be located and obtain multiple data frames in real time; if sequence frames are acquire through sensing d by the imaging sensor, the sequence frames are multiple image frames, and each pixel therein has, for example, corresponding brightness information and color information; if the sequence frames are acquired through sensing by the depth sensing sensor, the sequence frames are multiple depth maps, and each pixel or occupancy grid therein also has a corresponding depth dimension (reflecting depth information).

If it is necessary to monitor the barrier 905 all the time in the inspection and repair operation condition, multiple sensing apparatuses $310_1$ to $310_n$ all work simultaneously to acquire corresponding sequence frames, and each frame is transmitted to the processing apparatus 300. The processing apparatus 300 is responsible for performing data processing on each frame, and finally obtains information indicating whether the barrier 905 of the escalator 900 is in a normal state, for example, determine whether the barrier is missing.

Specifically, the processing apparatus 300 is configured to include a background acquisition module 301 and a foreground detection module 320. In a first case, the background acquisition module 301 may acquire a background model by using one or more 2D images or 3D depth maps when the barrier 905 is in a normal state, and in a second case, the background acquisition module 301 may acquire a background model by using one or more 2D images or 3D depth maps when the barrier 905 is not disposed in a region where the barrier 905 needs to be disposed. Therefore, in the first case, the background acquisition module 301 acquires a first background model by learning a data frame that is acquired when the barrier 905 is correctly disposed; in the second case, the background acquisition module 301 acquires a second background model by learning a data frame that is acquired when no barrier 905 is disposed. The first background model and the second background model may be established before maintenance and repair of the escalator 900, and the processing apparatus 300 is initialized during this period to obtain the background models. The background models may be established through learning by using, but not limited to, a Gaussian Mixture Model, a Code Book Model, Robust Principle Components Analysis (RPCA), and the like. A background model obtained by learning image frames acquired by the imaging sensor is a typical brightness background model or chromaticity background model; a background model obtained by learning frames acquired by the depth sensing sensor is a typical depth background model.

It should be understood that, at the subsequent barrier monitoring stage, the background model may be adaptively updated. When an application scenario, a sensor type, or a barrier type changes, a corresponding background model may be acquired again by means of learning at the initialization stage.

The foreground detection module 320 is configured to subtract, from the background model, a data frame acquired in real time to obtain a foreground object (taking the second background model as an example), or subtract the background model from a data frame acquired in real time to obtain a foreground object (taking the first background model as an example), for example, the foreground object is obtained by using a differential method. Taking the second background model as an example, if the barrier 905 is missing, a portion of the data frame corresponding to the barrier 905 is compared with a corresponding portion of the background model, and the obtained foreground object also includes a feature reflecting that the barrier 905 is missing.

In an embodiment, the foreground detection module 320 may eliminate noise of the foreground object by using some filtering technologies. For example, noise is eliminated by using erosion and dilation image processing technologies, so that the foreground object is obtained more accurately. It should be noted that, the filtering may include convolution about a spatial, temporal, or spatial-temporal kernel.

In an embodiment, the processing apparatus 300 further includes a foreground feature extraction module 330. The foreground feature extraction module 330 extracts a corresponding foreground feature from the foreground object. In order to monitor the barrier of the escalator 900, the extracted foreground feature includes features such as the shape and color of the foreground object (the barrier 905 is generally yellow, which is significantly different from colors of other objects), and may even include information such as the size and/or position. Taking the data frame acquired by the imaging sensor as an example, the color information is embodied by the chromaticity of pixels of the foreground object, and the shape, size and position information is embodied by brightness value changes of the pixels in the foreground object. Taking the data frame acquired by the depth sensing sensor as an example, the shape, size and position information is embodied by depth value changes of occupancy grids in the foreground object.

Further, the processing apparatus 300 further includes a barrier working condition judgment module 340. The working condition judgment module 340 judges whether the barrier 905 is in a normal state based on the foreground feature. Specifically, comparison judgment may be performed on the foreground feature by using the background model. For example, by comparing the shape, size and position features of the foreground object with shape, size and position features about the barrier in the background model, it is judged whether the barrier is missing; or by comparing the shape, size, position and color features of the barrier with shape, size, position and color features about the barrier in the background model, it is judged whether the barrier is missing. It should be noted that, the shape, size and color feature information about the barrier in the background model may be implemented in the background acquisition module 301.

By taking the background model being the first background model as an example, assuming that the foreground feature is mainly a foreground feature of a foreground object of maintenance personnel, and by comparing the foreground feature with the feature information about the barrier 905 in the first background model, it can be judged that the foreground feature is unrelated to the barrier 905. In this case, the barrier working condition judgment module 340 can easily judge that the barrier 905 is in a normal state. Assuming that the foreground feature is mainly a foreground feature of a foreground object of a barrier, by comparing the foreground feature with the feature information about the barrier 905 in the first background model, it can be judged that the foreground feature is the same or substantially the same as the barrier 905, and the barrier working condition judgment module 340 can easily judge that the barrier 905 is in a missing state.

By taking the background model being the second background model as an example, assuming that the foreground feature is a foreground feature of the foreground object of the barrier 905, by comparing the foreground feature with the feature information about the barrier 905 in the second background model, it can be judged that the foreground feature is related to the barrier 905, and it is further judged that a position feature in the foreground feature is substantially the same as the position information about the barrier 905 in the second background model; in this case, the barrier working condition judgment module 340 can easily judge that the barrier 905 is in a normal state. Assuming that the foreground feature is mainly a foreground feature of a foreground object of maintenance personnel, by comparing the foreground feature with the feature information about the barrier 905 in the second background model, it can be judged that the foreground feature is unrelated to the barrier 905, and the barrier working condition judgment module 340 can easily judge that the barrier 905 is in a missing state.

Further, taking barrier missing in 2D image processing as an example, a current 2D image frame is compared with the first background model to obtain the foreground object of the barrier 905, and based on the 2D image of the object, features such as the position, color and shape of the object are also extracted, which are further compared with the background model, for example, features such as shapes and colors are compared. Therefore, it can be judged that the barrier is missing, thus directly judging that the barrier 905 is in an abnormal state.

Further, taking barrier missing in depth map processing as an example, a current 3D depth map frame is compared with the first background model (a model based on depth information), to obtain the foreground object of the barrier 905. Features such as the position and 3D shape of the object are also extracted, which are further compared with the background model, for example, features such as 3D shapes corresponding to the same position are compared. Therefore, it can be judged that a particular position lacks a barrier, thus directly judging that the barrier 905 is in an abnormal state.

Further, the barrier working condition judgment module 340 may be configured to determine, only when judgment results based on multiple (such as two) continuous data frames are that a same barrier 905 is missing, that the current barrier 905 is in the abnormal state, which helps improve the judgment accuracy.

In still another embodiment, by taking the second background model as an example, when it is determined that the foreground object of the barrier is included, whether the barrier 905 is in a normal state in which the barrier is at a corresponding correct position is judged based on the position feature of the foreground object of the barrier, i.e., whether the barrier 905 is placed at a proper position is judged. The position feature of the foreground object of the barrier 905 is obtained by the foreground feature extraction module 330. When the data frame is obtained through sensing by the depth sensing sensor, the position feature of the foreground object of the barrier 330 is a 3D position feature. Specifically, the foreground feature extraction module 330 may extract 3D position features corresponding to multiple corner points (such as points at four corners) of the foreground object of the barrier 905 and/or a 3D position feature corresponding to the center of the foreground object of the barrier 905. With these position features, whether the barrier 905 is placed at a proper position can be judged more accurately.

When the barrier working condition judgment module 340 in the processing apparatus 300 in the foregoing embodiment determines that the monitored barrier 905 is in an abnormal state (for example, the barrier is missing), a corresponding signal may be sent to the passenger conveyor controller 910 of the escalator 900, so that corresponding measures are taken. For example, the controller 910 further sends a signal to a braking part (not shown in the figure) to perform braking. The processing apparatus 300 may further send a signal to an alarm unit 930 mounted above the escalator 900, to remind the passenger to watch out, and remind the maintenance personnel to arrange the barrier 905, for example, a message such as "the barrier is missing; do not take the escalator; please arrange a barrier immediately" is broadcast. Certainly, the processing apparatus 300 may further send a signal to an elevator maintenance center of a building, to prompt that on-site processing needs to be performed in time. Measures taken when it is found that the barrier 905 of the escalator 900 is in an abnormal state are not limited.

The monitoring system in the embodiment shown in FIG. 5 can automatically monitor the state of the barrier 905 during inspection and maintenance of the escalator 900, the monitoring is accurate and abnormal conditions of the barrier can be found in time, helping prevent safety accidents.

Figure 6:
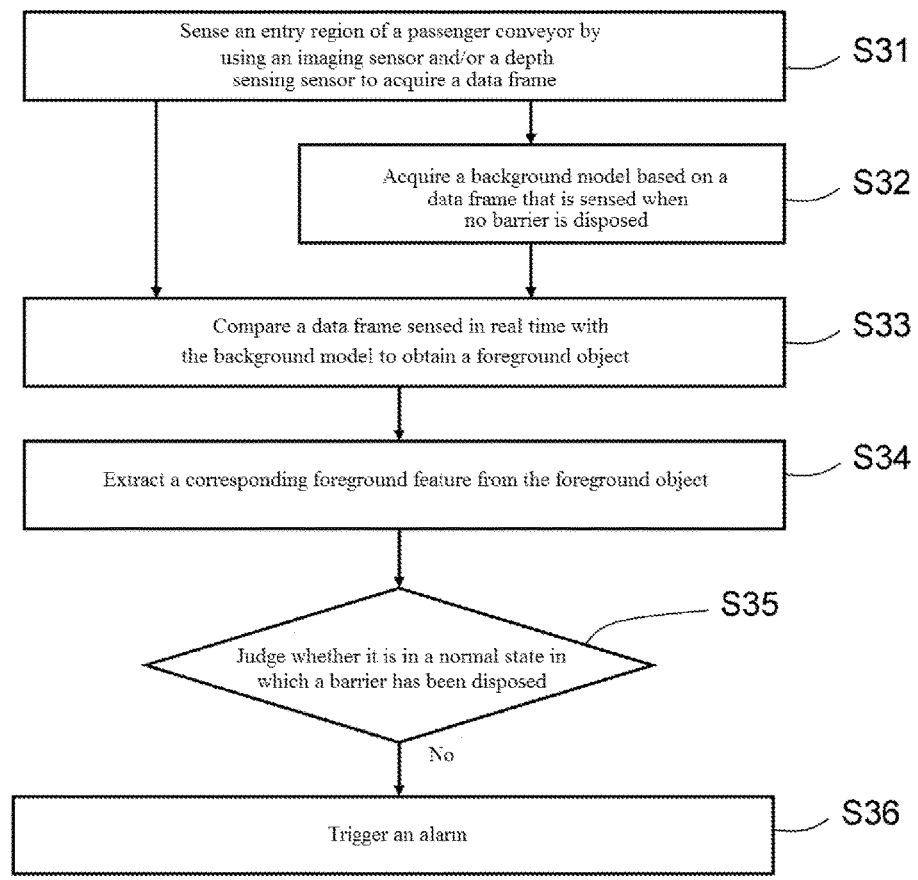
FIG. 6 is a schematic flowchart of a monitoring method of a passenger conveyor according to a third embodiment of the present invention.

A method procedure of barrier monitoring based on the monitoring system in the embodiment shown in FIG. 5 is illustrated according to FIG. 6. A working principle of the monitoring system according to the embodiment of the present invention is further described with reference to FIG. 5 and FIG. 6.

First, in step S31, entry/exit regions (901 and 902) of a passenger conveyor is sensed by using an imaging sensor and/or a depth sensing sensor to acquire a data frame. During acquisition of a background model through learning, a data frame corresponding to the first background model is acquired through sensing when the barrier 905 is correctly arranged, and a data frame corresponding to the second background model is acquired through sensing when the barrier 905 is not arranged; in other cases, the data frame is acquired at any time in a maintenance and repair working condition, for example, 30 data frames are acquired per second, and a predetermined number of data frames are acquired at predetermined intervals or acquired continuously, for use in subsequent analysis.

Further, in step S32, taking the second background model as an example, the background model is acquired based on a data frame sensed when the barrier is not arranged. This step is accomplished in the background acquisition module 301, and may be implemented at the initialization stage of the system. If both the imaging sensor and the depth sensing sensor are used, background models are acquired by learning separately based on data frames acquired by the imaging sensor and the depth sensing sensor respectively.

Further, in step S33, a data frame sensed in real time is compared with the background model to obtain a foreground object. This step is accomplished in the foreground detection module 320, and the foreground object may be sent to the barrier working condition judgment module 340 for analysis.

Further, in step S34, a corresponding foreground feature is extracted from the foreground object. This step is accomplished in the foreground feature extraction module 330, and the extracted foreground feature includes the shape and position of the foreground object, and even further includes information such as color and/or size.

Further, in step S35, it is judged whether it is in a normal state in which the barrier has been arranged, and if the judgment result is "no", it indicates that the barrier 905 is in an abnormal state currently, and step S36 is performed, to trigger alarming and escalator braking operations. Step S35 and step S36 are accomplished in the barrier working condition judgment module 340. The specific judgment method is already disclosed in the description about the barrier working condition judgment module 340.

So far, the barrier monitoring process in the maintenance and repair working condition in the foregoing embodiment has basically ended, and this process may be repeated and continuously performed, to continuously monitor the barrier of the escalator 900. It should be noted that, if both the imaging sensor and the depth sensing sensor are used, the imaging sensor and the depth sensing sensor may separately acquire respective data frames, and in steps S32 to S35, processing is separately performed on the respective data frames; and when the judgment result of the data frame corresponding to either of the imaging sensor and the depth sensing sensor is "no" in step S35, step S36 is performed. In another alternative embodiment, the process of steps S22 to S25 may be performed on data from the imaging sensor and the depth sensing sensor respectively by using one or more of the following technologies: Bayesian estimation, Maximum likelihood (ML), Maximum a priori (MAP), Non-linear least squares, and the like. In this way, defects of monitoring by either of the imaging sensor and the depth sensing sensor can be avoided, ensuring that the abnormal state of the barrier is detected timely and reliably.

Figure 7:
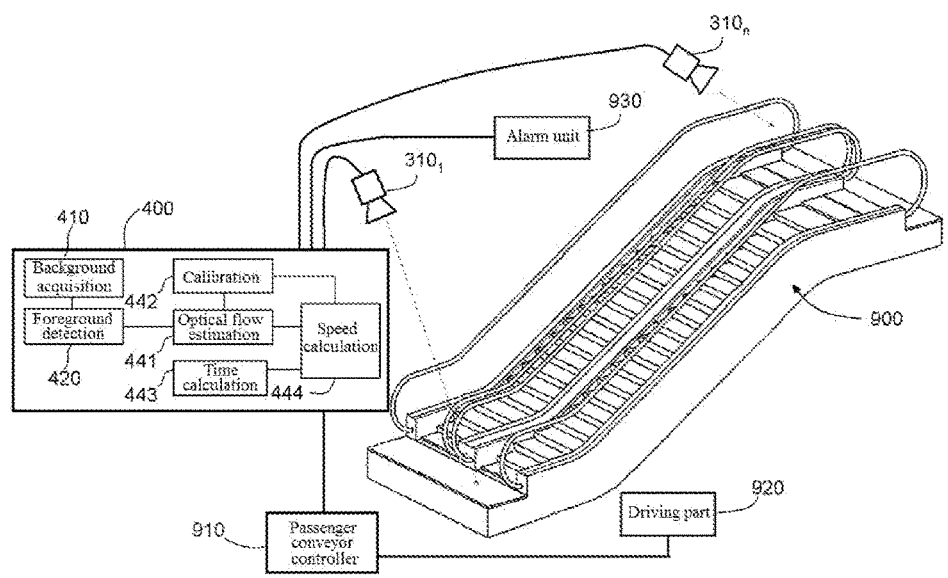
FIG. 7 is a schematic structural diagram of a monitoring system of a passenger conveyor according to a fourth embodiment of the present invention.

FIG. 7 is a schematic structural diagram of a monitoring system of a passenger conveyor according to a fourth embodiment of the present invention. The monitoring system of the embodiment shown in FIG. 7 is used for monitoring a running speed of a Step and/or Handrail of an escalator 900 illustrated in FIG. 7, and specifically includes a sensing apparatus 310 and a processing apparatus 400 coupled to the sensing apparatus 310. The escalator 900 includes a passenger conveyor controller 910, a driving part 920 such as a motor, and a brake/start button 940.

Specific arrangement of the sensing apparatus 310 is completely the same as that in the embodiment shown in FIG. 1, and descriptions thereof are omitted here.

Multiple sensing apparatuses $310_1$ to $310_n$ may acquire sequence frames formed by multiple corresponding continuous data frames in a daily operation condition of the escalator 900, to monitor a speed of a step of the escalator 920 in real time. The sequence frames are transmitted to the processing apparatus 400. The processing apparatus 400 is responsible for analyzing the sequence frames, and finally obtains speed information about the step and/or handrail of the escalator 900.

In this embodiment, the processing apparatus 400 is provided with a background acquisition module 410 and a foreground detection module 420. The background acquisition module 410 obtains one or more 2D images or 3D depth maps when the escalator 900 has no load (that is, in the absence of passengers), and calculates a background based on the 2D images or 3D depth maps. Therefore, the background acquisition module 410 acquires a background model by learning sequence frames acquired when it is determined that the escalator 900 is in a no-load normal operation condition. The background model may be established at an initialization stage of the monitoring system, that is, the system is initialized before the speed in the daily operation condition is monitored, to obtain a background model. The background model may be established through learning by using, but not limited to, a Gaussian Mixture Model, a Code Book Model, Robust Principle Components Analysis (RPCA), and the like. A background model obtained by learning sequence frames acquired by the imaging sensor is a typical brightness background model or chromaticity background model; a background model obtained by learning sequence frames acquired by the depth sensing sensor is, for example, a depth background model found by means of RPCA. In an embodiment, multiple sequence frames in a period of time may be integrated to acquire a background model through learning, to improve the precision of the background model.

It should be understood that, at the subsequent speed detection stage, the background model may be adaptively updated. When an application scenario, a sensor type, or a setting changes, a corresponding background model may be acquired again by means of learning at the initialization stage.

The foreground detection module 420 is configured to compare sequence frames acquired in real time with the background model to obtain a foreground object; in most cases, the foreground object is correspondingly a passenger or an article carried by the passenger. By obtaining the foreground object, information of a position or region where the foreground object is located in each frame may be obtained. The foreground detection module 420 then defines a region where the sequence frames have no foreground object as a speed sensing region, for example, a region without passenger interference in each frame (such as a step without passengers or a handrail region having a color identifier that is not covered by a hand of a passenger) is used for speed detection and judgment. Considering that passengers on the escalator 900 in the daily operation condition are variable and movable, if a passenger region in sequence frames is analyzed, it is possible that an optical flow estimation module 441 cannot obtain accurate shift information.

It should be noted that, in another embodiment, when the escalator 900 has a lot of passengers or is crowded, it may be difficult to acquire the speed sensing region about the step. In this case, the foreground detection module 420 may directly acquire a foreground object, for example, a passenger on the escalator 900. The optical flow estimation module 441 calculates a feature point based on the foreground object, and calculates, based on an optical flow method, a shift, in frame coordinates, of a corresponding feature point of the foreground object between any adjacent frames in the sequence frames. In other words, the shift of the foreground object is also calculated based on the optical flow method. In this embodiment, because a passenger may move on his/her own, the shift calculation may be inaccurate, causing an error in speed calculation. However, the running speed of the escalator 900 finally calculated based on the shift can basically reflect speed abnormal conditions such as reserve running, over-speed or under-speed, and also can be used for monitoring the daily operation condition of the escalator.

Specifically, in the comparison process of the acquired foreground object, if an imaging sensor is used, the data frame is a 2D image, and the background model is also formed based on the 2D image; the comparison process specifically may be differential processing, for example, a pixel of the 2D image is compared with a corresponding pixel of the background model to calculate a difference (such as a brightness difference). When the difference is greater than a predetermined value, the pixel is retained. Therefore, a foreground object can be obtained. If a depth sensing sensor is used, the data frame is a depth map, and the background model is also formed based on the 3D depth map. For example, an occupancy grid in the depth map may be compared with a corresponding occupancy grid of the background model (for example, a depth difference is calculated), and when the difference is greater than a predetermined value, depth information of the occupancy grid is retained (indicating that the occupancy grid is). Therefore, a foreground object can be obtained.

In an embodiment, the foreground detection module 420 may eliminate noise of the foreground object by using some filtering technologies. For example, noise is eliminated by using erosion and dilation image processing technologies, so that the foreground object is obtained more accurately. It should be noted that, the filtering may include convolution about a spatial, temporal, or spatial-temporal kernel.

The processing apparatus 400 further includes an optical flow estimation module 441. After the foreground detection module 420 defines the speed sensing region in the sequence frames, the optical flow estimation module 441 is configured to calculate, based on an optical flow method, a shift, in frame coordinates, of a corresponding feature point in the speed sensing region between any adjacent frames in the sequence frames. The optical flow estimation module 130 calculates a shift in frame coordinates based on the optical flow method, and Lucas-Kanade optical flow method may be specifically applied as the optical flow method. The type of the optical flow method specifically applied here is not limited.

Taking sequence frames acquired by the imaging sensor as an example, the sequence frames are multiple image frames, for example, 15 to 30 image frames are acquired per second, wherein each image frame pixel has a corresponding brightness value; if the imaging sensor can acquire color information, each image frame pixel further has corresponding color information. When a speed of, for example, a step is monitored, several points of an image corresponding to the step may be used as feature points. Specifically, points or small regions with significantly different brightness distributions in moving step images may be used as feature points. Each feature point may include one or more pixels. A speed vector is assigned to each pixel (including pixels of the feature points) in the images, to form an image movement field. When transferred to a two-dimensional image, the image movement field is expressed as an optical flow field, and the optical flow field reflects a brightness variation trend of each pixel on the image frames. For continuous sequence frames, a frame coordinate position corresponding to a feature point on a frame can be determined, and if the step moves, a point with basically the same brightness value is searched for around the same frame coordinate position on the acquired next frame adjacent to the current frame, and the found point is used as the feature point. When the same feature point is determined on the two adjacent frames, the shift in frame coordinates can be thus basically determined. Analogically, a shift, in frame coordinates, of a corresponding feature point between any adjacent frames can be determined. It should be understood that, if the feature point includes color information, the feature point may be determined based on the brightness value and/or a chromaticity value, thereby determining the shift.

Taking sequence frames acquired by the depth sensing sensor as an example, the sequence frames may be multiple depth maps, for example, 15 to 30 depth maps are acquired per second, and each frame includes depth map data of an object in a sensing field of view. When a speed of, for example, a step is monitored, several occupancy grids of a depth map corresponding to the step may be used as feature points. Specifically, grids or small regions with significant depth changes among numerous occupancy grids corresponding to the moving step may be used as feature points. Each feature point may include one or more occupancy grids. A speed vector is assigned to each occupancy grid (including pixels of the feature points) in the images, to form an image movement field. When transferred to a two-dimensional image, the image movement field is expressed as an optical flow field, and the optical flow field reflects a depth variation trend of each occupancy grid on the depth map. For continuous sequence frames, a frame coordinate position corresponding to a feature point on a frame can be determined, and if the step moves, a point with basically the same depth value is searched for around the same frame coordinate position on the acquired next frame adjacent to the current frame, and the found point is used as the feature point (for example, by means of Fast Fourier Transform). When the same feature point is determined on the two adjacent frames, the shift in frame coordinates can be thus basically determined. Analogically, a shift, in frame coordinates, of a corresponding feature point between any adjacent frames can be determined.

It should be noted that the shift may include not only a shift value, but also shift direction information.

The processing apparatus 400 is further configured to include a calibration module 442. The calibration module 442 transforms the shift of the feature point in the frame coordinates into a shift in spatial global coordinates. The calibration process may be completed offline in advance before speed detection. For example, after the imaging sensor and/or depth sensing sensor is mounted or after a key setting thereof changes, calibration is performed again. A specific method used for calibration is not limited.

The processing apparatus 400 is further configured with a time calculation module 443, which determines a time quantity between any adjacent frames in the sequence frames. For example, if 30 frames are acquired per second, the time quantity between adjacent frames is approximately 1/30 second. Specifically, each frame may be marked with a time stamp when acquired, and in this way, the time quantity between any frames can be acquired. It should be understood that, the "adjacent frames" refers to that the frames for analysis are adjacent to each other in time, and may be successively acquired frames.

The processing apparatus 400 is further configured with a speed calculation module 444. The speed calculation module 444 calculates speed information of time points corresponding to any adjacent frames based on the shift of the feature point in the spatial global coordinates and the corresponding time quantity, and further combines the speed information to obtain speed information of the sequence frames. For example, if n sequence frames are acquired per second, (n−1) pieces of speed information can be obtained per second, and the (n−1) pieces of speed information are combined to obtain speed information of the n sequence frames. It should be noted that, the speed information may include speed magnitude information and speed direction information. Therefore, the speed calculation module 444 can judge, based on the speed direction information, whether the step of the escalator 900 runs reversely, and judge, based on the speed magnitude information, whether speed anomaly occurs. In this way, the daily operation condition of the escalator 900 can be monitored in real time, to detect a running speed anomaly of the escalator 900 in time, that is, detect an abnormal state of the running speed in time.

When finding that the running speed of the escalator 900 is in an abnormal state (e.g., over-speed or reverse running), the speed calculation module 444 may send a corresponding signal to the passenger conveyor controller 910 of the escalator 900, to take corresponding measures. For example, the controller 910 further sends a signal to the driving part 920 to reduce the running speed of the step and the handrail. The processing apparatus 400 may further send a signal to the alarm unit 930 mounted above the escalator 900, to remind the passenger to watch out and prevent the passenger from falling over. Certainly, the processing apparatus 400 may further send a signal to an elevator maintenance center of a building, to prompt that on-site processing needs to be performed in time. Specific measures taken when it is found that the running speed of the escalator 900 is abnormal are not limited.

It should be noted that, the optical flow estimation module 441, the calibration module 442, the time calculation module 443, and the speed calculation module 444 in the processing apparatus 400 mainly form a working condition judgment module in the processing apparatus 400.

Figure 8:
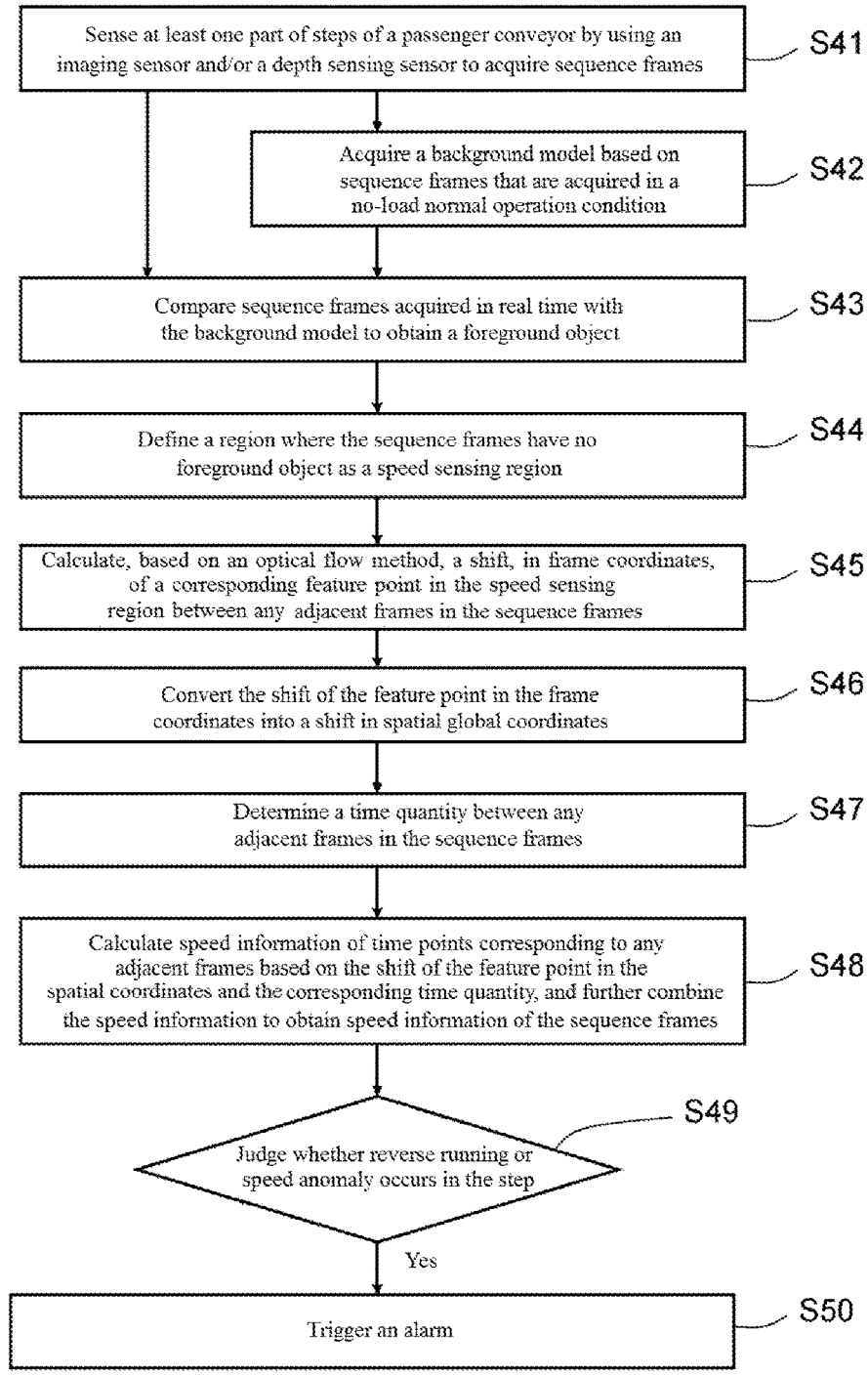
FIG. 8 is a schematic flowchart of a monitoring method of a passenger conveyor according to a fourth embodiment of the present invention.
Figure 9:
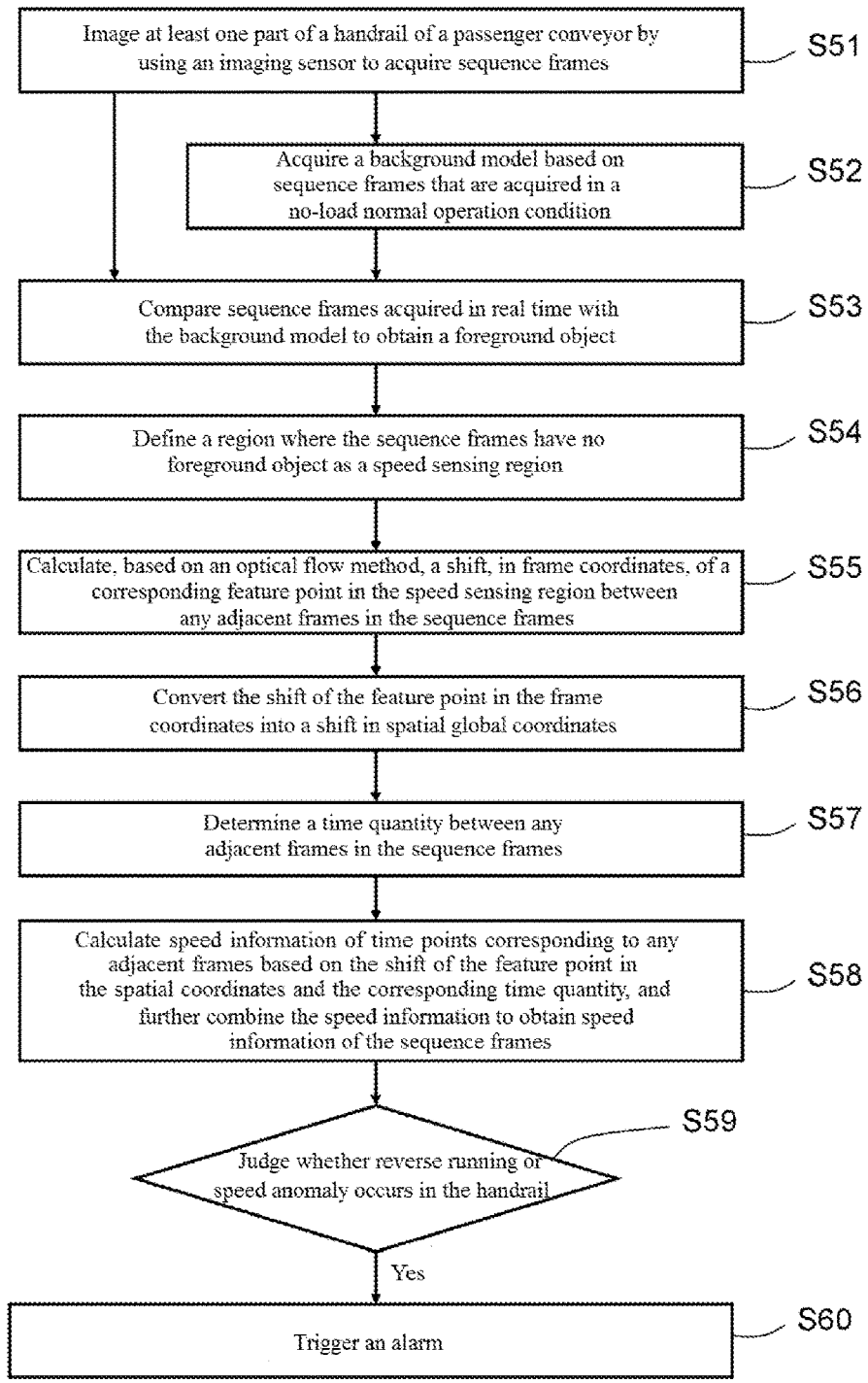
FIG. 9 is a schematic flowchart of a monitoring method of a passenger conveyor according to a fifth embodiment of the present invention.

Method procedures of step speed detection and handrail speed monitoring based on the monitoring system in the embodiment shown in FIG. 7 are separately illustrated according to FIG. 8 and FIG. 9. A working principle of the monitoring system according to the embodiment of the present invention is further described with reference to FIG. 7, FIG. 8 and FIG. 9.

Taking running speed monitoring of the step of the escalator 900 in the daily operation condition as an example, as shown in FIG. 7 and FIG. 8, first, in step S41, at least one part of steps of the passenger conveyor is sensed by using an imaging sensor and/or a depth sensing sensor to acquire sequence frames, and when a background model is acquired through learning, the sequence frames are acquired by means of sensing in a no-load normal operation condition; in other cases, the sequence frames are acquired at any time in a daily operation condition. For example, sequence frames in a period of time less than or equal to 1 second may be acquired for subsequent analysis.

Further, in step S42, a background model is acquired based on the sequence frames that are acquired when the passenger conveyor is in the no-load normal operation condition. This step is accomplished in the background acquisition module 410, and may be implemented at an initialization stage of the system; or the acquired background model may be updated adaptively, for example, adaptive background algorithms such as GMM and RPCA are used.

Further, in step S43, sequence frames acquired in real time are compared with the background model one by one to obtain a foreground object. This step is accomplished in the foreground detection module 420.

Further, in step S44, a region where the sequence frames have no foreground object is defined as a speed sensing region. Frame-by-frame processing on each frame of this step is accomplished in the foreground detection module 420.

Further, in step S45, a shift, in frame coordinates, of a corresponding feature point in the speed sensing region between any adjacent frames in the sequence frames is calculated based on an optical flow method. Specific calculation of the shift is accomplished in the optical flow estimation module 441. In another embodiment, when it is difficult to define the speed sensing region, a shift, in frame coordinates, of a corresponding feature point of the foreground object between any adjacent frames in the sequence frames may also be calculated based on the optical flow method.

Further, in step S46, the shift of the feature point in the frame coordinates is converted into a shift in spatial global coordinates. This step is accomplished in the calibration module 442.

Further, in step S47, the time quantity between any adjacent frames in the sequence frames is determined. This step is accomplished in the time calculation module 443.

Further, in step S48, speed information of time points corresponding to any adjacent frames is calculated based on the shift of the feature point in the spatial coordinates and the corresponding time quantity, and is further combined to obtain speed information of the sequence frames. This step is accomplished in the speed calculation module 444.

Further, in step S49, it is judged whether reverse running or speed anomaly occurs in the step, and if the judgment result is "yes", alarm is triggered, that is, step S50 is performed. Step S49 is accomplished in the speed calculation module 444, which can judge, based on speed direction information, whether the step runs reversely, and judge, based on speed magnitude information, whether the speed of the step is abnormal (judging whether the speed exceeds a predetermined speed). In step S50, a signal may further be sent to the controller 910 of the escalator 900, to control the speed of the escalator 900 or brake the escalator 900. Specific measures taken when it is found that the running speed of the escalator 900 is abnormal are not limited.

So far, the step speed detection process in the daily operation condition in the foregoing embodiment has basically ended, and this process may be repeated and continuously performed, to continuously monitor the running speed of the step of the escalator 900. It should be noted that, if both the imaging sensor and the depth sensing sensor are used, the imaging sensor and the depth sensing sensor may separately acquire respective sequence frames, and in steps S42 to S48, processing is separately performed on the respective sequence frames.

Taking running speed detection of the handrail of the escalator 900 in the daily operation condition as an example, as shown in FIG. 7 and FIG. 9, in this embodiment, only an imaging sensor, which is capable of acquiring color information and brightness information, is used for monitoring the speed of the handrail. Moreover, the handrail is provided with one or more color identifiers whose color is significantly different from the color of the handrail.

First, in step S51, at least one part of a handrail of the passenger conveyor is imaged by using the imaging sensor to acquire sequence frames. When a background model is acquired through learning, the sequence frames are acquired by means of sensing in a no-load normal operation condition; in other cases, the sequence frames are acquired at any time in a daily operation condition. For example, sequence frames in a period of time less than or equal to 1 second may be acquired for subsequent analysis.

Further, in step S52, a background model is acquired based on the sequence frames that are acquired when the passenger conveyor is in the no-load normal operation condition. This step is accomplished in the background acquisition module 410, and may be implemented at an initialization stage of the system; or the acquired background model may be updated adaptively, for example, methods such as GMM and RPCA are used.

Further, in step S53, sequence frames acquired in real time are compared with the background model one by one to obtain a foreground object. This step is accomplished in the foreground detection module 420.

Further, in step S54, a region where the sequence frames have no foreground object is defined as a speed sensing region. This step is accomplished in the foreground detection module 420.

Further, in step S55, a shift, in frame coordinates, of a corresponding feature point in the speed sensing region between any adjacent frames in the sequence frames is calculated based on an optical flow method. This step is accomplished in the optical flow estimation module 441 by processing the frames one by one. A pixel or a pixel region, for example, a point on the edge of the color identifier, with a significant chromaticity change in images of the moving handrail may be selected as the feature point. During calculation based on the optical flow method, an optical flow field reflects a chromaticity variation trend of each point on the image frame, and the shift, in frame coordinates, of a corresponding feature point between adjacent frames is determined based on chromaticity values.

Further, in step S56, the shift of the feature point in the frame coordinates is converted into a shift in spatial global coordinates. This step is accomplished in the calibration module 442.

Further, step S57, the time quantity between any adjacent frames in the sequence frames is determined. This step is accomplished in the time calculation module 443.

Further, in step S58, speed information of time points corresponding to any adjacent frames is calculated based on the shift of the feature point in the spatial coordinates and the corresponding time quantity, and is further combined to obtain speed information of the sequence frames. This step is accomplished in the speed calculation module 444.

Further, in step S59, it is judged whether reverse running or speed anomaly occurs in the handrail, and if the judgment result is "yes", alarm is triggered, that is, step S60 is performed. Step S49 is accomplished in the speed calculation module 444, which can judge, based on speed direction information, whether the handrail runs reversely, and judge, based on speed magnitude information, whether the speed of the handrail is abnormal (judging whether the speed exceeds a predetermined speed).

So far, the handrail speed detection process in the daily operation condition in the foregoing embodiment has basically ended, and this process may be repeated and continuously performed, to continuously monitor the running speed of the handrail of the escalator 900.

The step or escalator monitoring method in the foregoing embodiment may be accomplished based on an imaging sensor or a depth sensing sensor, and may be accomplished in place of the existing speed sensor. Moreover, the method can monitor the speed of the escalator in the daily operation condition in real time and find a running anomaly of the escalator in time. The method is highly intelligent, and can effectively ensure the safety of passengers.

In the monitoring system in the embodiment shown in FIG. 7 and the monitoring method in the embodiments shown in FIG. 8 and FIG. 9, if the monitoring system uses both the imaging sensor and the depth sensing sensor at the same time, the data frame may include a first data frame acquired by the imaging sensor and a second data frame acquired by the depth sensing sensor. The background acquisition module and the foreground detection module are both configured to separately process the first data frame and the second data frame to obtain a corresponding foreground object. The optical flow estimation module, the calibration module, the time calculation module and the speed calculation module are all configured to separately process sequence frames formed by the first data frames and sequence frames formed by the second data frames, to correspondingly obtain first speed information and second speed information. In an embodiment, the speed calculation module performs weighting calculation based on the first speed information and the second speed information to obtain speed information of the sequence frames acquired by the imaging sensor and the depth sensing sensor. The speed information respectively calculated based on the imaging sensor and the depth sensing sensor may be inaccurate, for example, the imaging sensor may cause the calculated first speed information to be relatively inaccurate when the ambient light intensity changes significantly, and the depth sensing sensor may also cause the calculated second speed information to be relatively inaccurate in an ambient condition where acquired depth information is inaccurate. Therefore, by means of the weighting calculation on the first speed information and the second speed information, the accuracy of speed detection can be improved. It should be understood that, the value of a weighting ratio may be determined according to an actual application environment condition and the like.

It should be noted that, the processing apparatus (100 or 200 or 300 or 400) in the monitoring system in the embodiments shown in FIG. 1, FIG. 3, FIG. 5 and FIG. 7 may be disposed in a control center of a building, or may be integrated with the controller 910 of the escalator 900 or the like, and the specific setting form is not limited. Moreover, more than one monitoring system in the embodiments shown in FIG. 1, FIG. 3, FIG. 5 and FIG. 7 may be integrated for implementation, and share the sensing apparatus 310, thereby simultaneously monitoring more than one of the landing plate, the step, the barrier used in the maintenance and repair working condition, and the speed of the step, to reduce costs.

It should be noted that the elements disclosed and depicted herein (including flowcharts and block diagrams in the accompanying drawings) imply logical boundaries between the elements. However, according to software or hardware engineering practices, the depicted elements and the functions thereof may be implemented on machines through a computer executable medium. The computer executable medium has a processor capable of executing program instructions stored thereon as a monolithic software structure, as standalone software modules, or as modules that employ external routines, code, services, and so forth, or any combination thereof, and all such implementations may fall within the scope of the present disclosure.

Although the different non-limiting implementation solutions have specifically illustrated components, the implementation solutions of the present invention are not limited to those particular combinations. It is possible to use some of the components or features from any of the non-limiting implementation solutions in combination with features or components from any other non-limiting implementation solutions.

Although particular step sequences are shown, disclosed, and claimed, it should be appreciated that the steps may be performed in any order, separated or combined, unless otherwise indicated and will still benefit from the present disclosure.

The foregoing description is exemplary rather than defined by the limitations within. Various non-limiting implementation solutions are disclosed herein, however, persons of ordinary skill in the art would recognize that various modifications and variations in light of the above teachings will fall within the scope of the appended claims. It is therefore to be appreciated that within the scope of the appended claims, the disclosure may be practiced other than as specifically disclosed. For that reason, the appended claims should be studied to determine the true scope and content.

The invention claimed is:

1. A monitoring system of a passenger conveyor, comprising:
   an imaging sensor and/or a depth sensing sensor configured to sense a monitored object of the passenger conveyor to acquire a data frame;
   a processing apparatus configured to analyze and process the data frame to monitor whether the monitored object is in a normal state, the processing apparatus being configured to comprise:
   a background acquisition module configured to acquire a background model based on a data frame that is sensed when the monitored object is in a no load normal state;
   a foreground detection module configured to compare each pixel of a data frame sensed in real time with the background model to obtain a foreground object; and
   a working condition judgment module configured to perform data processing at least based on the foreground object to judge whether the monitored object is in a normal state, wherein when the foreground object is a passenger, the working condition judgement module determines that the monitored object is in a normal condition.

2. The monitoring system of claim 1, wherein the monitored object comprises a speed of at least a step of the passenger conveyor in a daily operation condition, the data frame is sequence frames acquired in a particular period of time by means of sensing, and the working condition judgment module judges that the monitored object is in an abnormal state when at least the running speed of the step is over-speed or the step runs reversely.

3. The monitoring system of claim 1, wherein when the monitoring system comprises both the imaging sensor and the depth sensing sensor, the data frame comprises a first data frame acquired by the imaging sensor and a second data frame acquired by the depth sensing sensor;
wherein the background acquisition sub-module is configured to acquire background models based on the first data frame and the second data frame respectively;
the foreground detection module is configured to obtain a first foreground object and a second foreground object based on the first data frame and the second data frame respectively; and
the working condition judgment module is configured to perform data processing based on the first foreground object and the second foreground object to separately judge whether the monitored object is in a normal state, and determine that the monitored object is in an abnormal state only when both the judgment results are that the monitored object is in an abnormal state.

4. The monitoring system of claim 1, wherein the processing apparatus is further configured to: when the working condition judgment module determines that the monitored object is in an abnormal state, trigger outputting of a signal to the passenger conveyer and/or an elevator maintenance center of a building, to prevent a safety accident.

5. A passenger conveying system, comprising a passenger conveyor and the monitoring system according to claim 1.

6. The monitoring system of claim 1, wherein the processing apparatus further comprises:
a foreground feature extraction module configured to extract a corresponding foreground feature from the foreground object according to the monitored object;
wherein the working condition judgment module judges, based on the foreground feature, whether the monitored object is in a normal state.

7. The monitoring system of claim 6, wherein the monitored object comprises a step of the passenger conveyor, and the working condition judgment module judges that the step is in an abnormal state when the step is missing.

8. The monitoring system of claim 6, wherein the monitored object comprises a landing plate of the passenger conveyor, and the working condition judgment module judges that the landing plate is in an abnormal state when the landing plate is displaced or missing.

9. The monitoring system of claim 8, wherein there are two imaging sensors and/or depth sensing sensors, which are disposed approximately above entry/exit regions at two ends of the passenger conveyor respectively, to separately sense landing plates in the entry/exit regions.

10. The monitoring system of claim 8, wherein the foreground feature extracted by the foreground feature extraction module comprises one or more of a shape feature, a size feature, and a position feature of the foreground object, and the working condition judgment module judges, based on one or more of the shape feature, the size feature, and the position feature of the foreground object, whether the landing plate is displaced or missing.

11. The monitoring system of claim 6, wherein the monitored object comprises a barrier used in the passenger conveyor in a maintenance and repair working condition, and the working condition judgment module judges that the barrier is in an abnormal state when the barrier is missing and/or placed at an improper position.

12. The monitoring system of claim 11, wherein the background acquisition module is configured to acquire a first background model based on a data frame that is sensed when the barrier is in a normal state, or acquire a second background model based on a data frame that is sensed in an abnormal state in which the barrier is not disposed.

13. The monitoring system of claim 11, wherein the working condition judgment module is further configured to: when a judgment result of at least two continuous data frames is that the barrier is in a same abnormal state, determine that the barrier is in the abnormal state.

14. The monitoring system of claim 11, wherein the foreground feature extracted by the foreground feature extraction module comprises one or more of a shape feature, a size feature, and a position feature of the foreground object, and the working condition judgment module judges, based on one or more of the shape feature, the size feature, and the position feature of the foreground object, whether the barrier is missing and/or is placed at an improper position.

15. The monitoring system of claim 14, wherein when the data frame is acquired by the imaging sensor, the foreground feature extracted by the foreground feature extraction module further comprises a color feature of the foreground object, and the working condition judgment module further judges, in combination with the color feature of the foreground object, whether the barrier is missing and/or is placed at an improper position.

16. A monitoring method of a passenger conveyor, comprising steps of:
sensing a monitored object of the passenger conveyor to acquire a data frame;
acquiring a background model in advance based on a data frame that is sensed when the monitored object is in a no load normal state;
comparing a data frame sensed in real time with the background model to obtain a foreground object; and
performing data processing at least based on the foreground object to judge whether the monitored object is in a normal state, wherein when the foreground object is a passenger, the data processing determines that the monitored object is in a normal condition.

17. The monitoring method of claim 16, further comprising a step of: extracting a corresponding foreground feature from the foreground object according to the monitored object;
wherein in the judgment step, whether the monitored object is in a normal state is judged based on the foreground feature.

18. The monitoring method of claim 16, wherein the monitored object comprises a step of the passenger conveyor; and in the judgment step, the step is judged to be in an abnormal state when the step is missing.

19. The monitoring method of claim 16, wherein the monitored object comprises a barrier used in the passenger conveyor in a maintenance and repair working condition, and in the judgment step, the barrier is judged to be in an abnormal state when the barrier is missing and/or placed at an improper position.

20. The monitoring method of claim 16, wherein the monitored object comprises a speed of at least a step of the passenger conveyor in a daily operation condition, the data frame is sequence frames acquired in a particular period of time by means of sensing; and in the judgment step, the step is judged to be in an abnormal state when at least the running speed of the step is over-speed or the step runs reversely.

21. The monitoring method of claim 16, wherein the data frame comprises a first data frame acquired by the imaging sensor and a second data frame acquired by the depth sensing sensor;
wherein in the step of acquiring a background model, background models are acquired based on the first data frame and the second data frame respectively;
in the step of obtaining a foreground object, a first foreground object and a second foreground object are obtained based on the first data frame and the second data frame respectively; and
in the judgment step, data processing is performed based on the first foreground object and the second foreground object to separately judge whether the monitored object is in a normal state, and it is determined that the monitored object is in an abnormal state only when both the judgment results are that the monitored object is in an abnormal state.

22. The monitoring method of claim 16, wherein in the judgment step, when it is determined that the monitored object is in an abnormal state, outputting of a signal to the passenger conveyer and/or an elevator maintenance center of a building is triggered, to prevent a safety accident.

23. The monitoring method of claim 16, wherein the monitored object comprises a landing plate of the passenger conveyor, and in the judgment step, the landing plate is judged to be in an abnormal state when the landing plate is displaced or missing.

24. The monitoring method of claim 23, wherein in the step of acquiring a background model, the background model is acquired based on the data frame that is sensed when the monitored object is in a normal state; and in the judgment step, when there is basically no foreground object, it is directly determined that the monitored object is in a normal state.

25. The monitoring method of claim 23, wherein in the step of extracting a foreground feature, the extracted foreground feature comprises one or more of a shape feature, a size feature, and a position feature of the foreground object; and in the judgment step, whether the landing plate is displaced or missing is judged based on one or more of the shape feature, the size feature, and the position feature of the foreground object.

26. The monitoring method of claim 25, wherein the feature extracting step further comprises one or more of the following features: Scale Invariant Feature Transform, Speed-Up Robust Feature, Affine Scale Invariant Feature Transform, other SIFT variables, Harris Corner Detector, Smallest Univalue Segment Assimilating Nucleus, FAST corner detection, Phase Correlation, Normalized Cross-Correlation, Gradient Location Orientation Histogram, Binary Robust Independent Elementary Features, Center Surround Extremas, and Oriented and Rotated Binary Robust Independent Elementary Features.

27. The monitoring method of claim 25, wherein the shape feature comprises one or more of the following features: histogram of oriented gradients, Zernike moment, Centroid Invariance to boundary point distribution, and Contour Curvature.

28. The monitoring method of claim 25, wherein in the judgment step, used features are compared or classified by using one or more of the following technologies: clustering, Deep Learning, Convolutional Neural Networks, Recursive Neural Networks, Dictionary Learning, Bag of visual words, Support Vector Machine, Decision Trees, and Fuzzy Logic.

* * * * *